July 25, 1961 R. C. ALDERSON ET AL 2,993,664

AUTOMATIC INSTRUMENT LANDING SYSTEMS FOR AIR-BORNE CRAFT

Filed Sept. 15, 1948 9 Sheets-Sheet 1

Inventors
ROSS C. ALDERSON
BENJAMIN CARPENTER, DECEASED
By WALTER T. FISHER, EXECUTOR
BY George H. Fisher
Attorney Inventors
ROSS C. ALDERSON
BENJAMIN CARPENTER, DECEASED
By WALTER T. FISHER, EXECUTOR
BY George H. Fisher
Attorney July 25, 1961 R. C. ALDERSON ET AL 2,993,664

AUTOMATIC INSTRUMENT LANDING SYSTEMS FOR AIR-BORNE CRAFT

Filed Sept. 15, 1948 9 Sheets-Sheet 3

Inventors
ROSS C. ALDERSON
BENJAMIN CARPENTER, DECEASED
By WALTER T. FISHER, EXECUTOR
BY George H. Fisher
Attorney July 25, 1961 R. C. ALDERSON ET AL 2,993,664

AUTOMATIC INSTRUMENT LANDING SYSTEMS FOR AIR-BORNE CRAFT

Filed Sept. 15, 1948 9 Sheets-Sheet 4

Inventors
ROSS C. ALDERSON
BENJAMIN CARPENTER, DEC'D.
BY WALTER T. FISHER, EXECUTOR
BY George H. Fisher
Attorney July 25, 1961 R. C. ALDERSON ET AL 2,993,664

AUTOMATIC INSTRUMENT LANDING SYSTEMS FOR AIR-BORNE CRAFT

Filed Sept. 15, 1948

9 Sheets-Sheet 5

Inventors
ROSS C. ALDERSON
BENJAMIN CARPENTER, DECEASED
BY WALTER T. FISHER, EXECUTOR
BY George H. Fisher
Attorney Inventors
ROSS C. ALDERSON
BENJAMIN CARPENTER, DECEASED
WALTER T. FISHER, EXECUTOR
By
BY George H. Fisher
Attorney July 25, 1961 R. C. ALDERSON ET AL 2,993,664

AUTOMATIC INSTRUMENT LANDING SYSTEMS FOR AIR-BORNE CRAFT

Filed Sept. 15, 1948

9 Sheets-Sheet 7

Inventors
ROSS C. ALDERSON
BENJAMIN CARPENTER, DEC'D.
BY WALTER T. FISHER, EXECUTOR
BY George H. Fisher
Attorney

AUTOMATIC INSTRUMENT LANDING SYSTEMS FOR AIR-BORNE CRAFT

Filed Sept. 15, 1948

9 Sheets-Sheet 8

Inventors
ROSS C. ALDERSON
BENJAMIN CARPENTER, DECEASED
BY WALTER T. FISHER, EXECUTOR
BY George H. Fisher
Attorney

AUTOMATIC INSTRUMENT LANDING SYSTEMS FOR AIR-BORNE CRAFT

Filed Sept. 15, 1948 9 Sheets-Sheet 9

Inventors
ROSS C. ALDERSON
BENJAMIN CARPENTER, DECEASED
By WALTER T. FISHER, EXECUTOR
BY George H. Fisher
Attorney United States Patent Office 2,993,664
Patented July 25, 1961

2,993,664

AUTOMATIC INSTRUMENT LANDING SYSTEMS FOR AIR-BORNE CRAFT

Ross C. Alderson, Minneapolis, Minn., and Benjamin Carpenter, deceased, late of Lake Forest, Ill., by Walter T. Fisher, executor, Chicago, Ill.; said Ross C. Alderson and Benjamin Carpenter assignors to Minneapolis-Honeywell Regulator Company, Minneapolis, Minn., a corporation of Delaware Filed Sept. 15, 1948, Ser. No. 49,442
18 Claims. (Cl. 244—77)

This invention relates to the field of aviation, and more particularly to instrument systems designed to make it possible for air-borne craft to land at a given airport regardless of the visibility at the airport. The system includes an automatic pilot for the craft in question, an instrument landing installation for detecting departure of the craft from a predetermined path in azimuth and elevation, and coupling means for bringing about operation of the former under the control of the latter.

Automatic pilots for air-borne craft are not broadly novel: a clear disclosure of one such automatic pilot is to be found in the November 1944 issue of "Electrical Engineering," beginning at page 849 of volume 63 of that publication. Nor is the provision of an instrument landing installation broadly new: the principles and characteristics of one such installation are described in Technical Development Reports 35 and 55 of the Civil Aeronautics Administration, published in October 1943 and June 1947 respectively. Up to the present, however, no satisfactory means have been provided enabling the instrument landing receiver, which always operated as simply an indicator, to exercise control over an automatic pilot, and automatically bring about such changes in the control surfaces of the craft as may be required to cause it to follow a desired landing path, without the intervention of a human intermediary. The present invention is designed to accomplish this.

It is an object of the invention to provide improved means for automatically controlling the course of a craft so that it follows a predetermined path relative to the surface of the earth.

Another object of the invention is to provide improved means for operating an automatic pilot, designed for energization with alternating voltage, in accordance with signals from an instrument landing receiver having a unidirectional voltage output, so that the craft follows the instrument approach path.

It is another object of the invention to provide means for coupling such an A.C. automatic pilot and D.C. instrument landing receiver to supply the former with alternating signal voltages from a selected source under the control of the latter, the alternating voltage so supplied being either in phase with or 180° out of phase with that of the source.

Yet another object of the invention is to provide such a coupler in which voltage outputs of the proper phase relation are obtained from a source of alternating voltage common to both the coupler and the automatic pilot by a full-wave phase-sensitive discriminator including electron discharge tubes whose grids are energized with amplified unidirectional voltage proportional to the output voltage of the instrument landing receiver.

Yet another object of the invention is to provide such a coupler in which the unidirectional grid voltages are derived from the direct voltages of the instrument landing receiver by a D.C. amplifier including a mechanical interrupter, a wave shaper, an electronic amplifier, and a phase sensitive full wave rectifier, the latter of which may be either mechanical, and associated with the interrupter, or electronic.

Yet another object of the invention is to provide a system in which the output of the coupling unit not only affects the course control components of the automatic pilot, but also controls erection cut-out means for a vertical gyroscope which serves as a standard of attitude for the autopilot.

A further object of the invention is to provide means for a causing a craft to follow a particular path, in which departure of the craft from the desired path is detected by means of a radio instrument and results in operation of an automatic pilot to return the craft to the path, and in simultaneous disabling of the erection system of a vertical gyroscope in the automatic pilot.

A further object of the invention is to provide such a system in which are switch means for adjusting the degree to which the radio signal is modified according to its rate of change, for introducing low pass filtering action into the response of the system, for reversing the sense of the control exercised by the radio system, and for adjusting the amount of such control resulting from a given radio signal.

A further object of the invention is to provide a system in which it is possible by operation of a suitable mechanism to cause the craft to reverse the direction in which it is following the beam, the change in direction always being initiated in a predetermined direction.

A further object of the invention is to provide such a coupling means which maintains itself in a balanced condition when not in immediate use, so that no sudden application of control may take place in the automatic pilot when control thereof by radio is initiated.

A still further object of the invention is to provide such a system having switch means such as in a first position to adapt the system for outbound flight, away from the airport; in a second position to adapt the system for inbound flight, toward the airport; in a third position to cause the system to respond to elevation as well as azimuth signals; in a fourth position to automatically cause the craft to turn in a predetermined direction from an outbound course to an inbound course; and in a fifth position to restore to the automatic pilot sole control of the craft.

A still further object of the invention is to provide such a system having switch means such as in a first position to adapt the system for outbound flight, away from the airport; in a second position to adapt the system for inbound flight, toward the airport; in a third position to cause the system to respond to elevation as well as azimuth signals; and in a fourth position to restore to the automatic pilot sole control of the craft.

A still further object of the invention is to provide means for causing turn of the craft in response to radio signals without losing the advantage of gyroscopic stabilization of the craft about the turn axis during the turn.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which are illustrated and described certain preferred embodiments of the invention.

Figure 2:
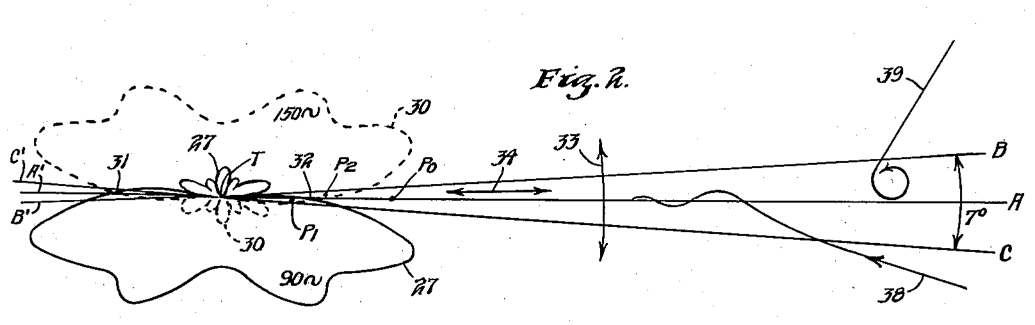
FIGURES 2 and 3 illustrate in plan and elevation the path in space set up by the complex electromagnetic radiation emitted by the transmitters of the instrument landing installation.
Figure 6:
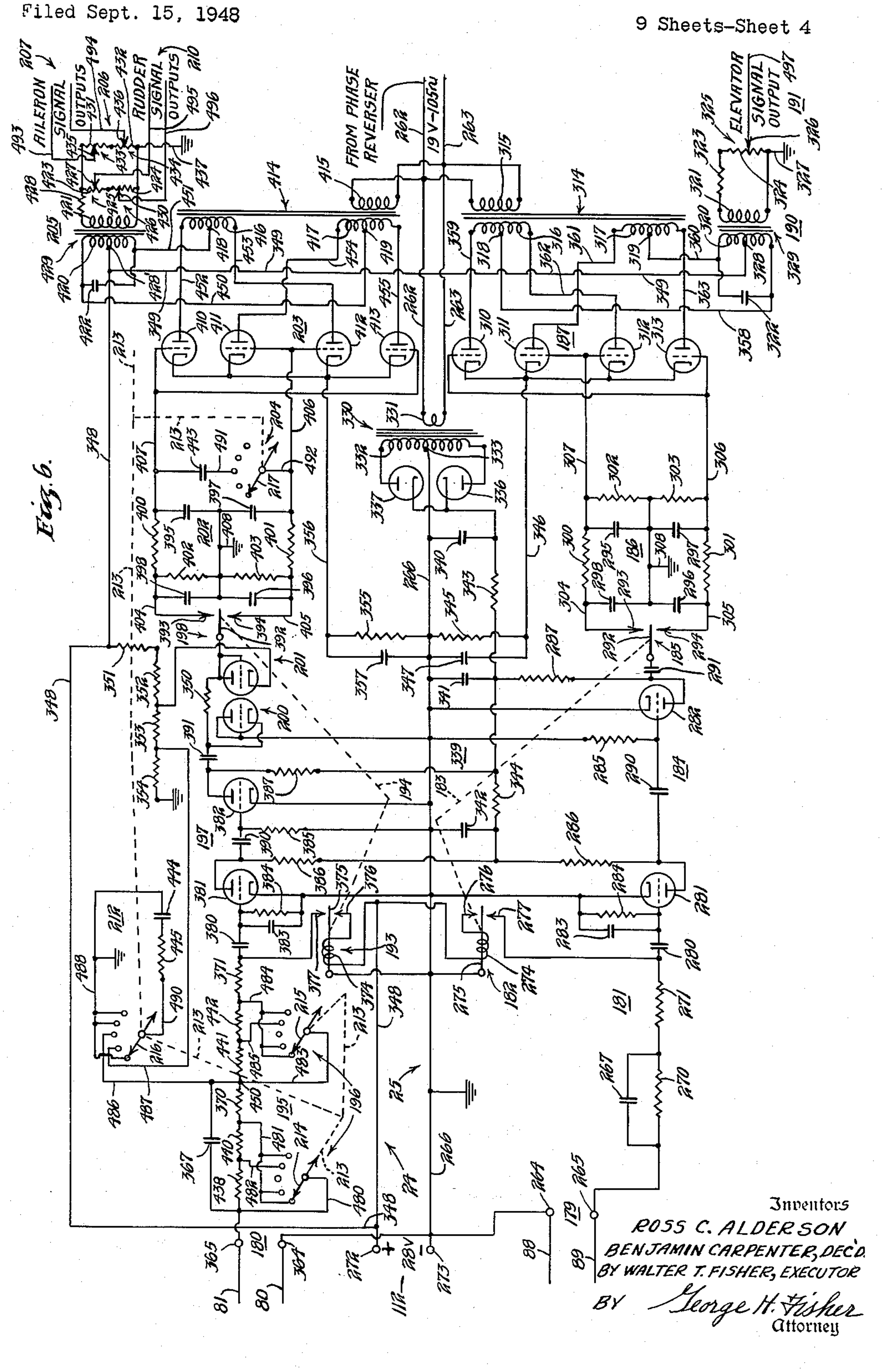
FIGURE 6 is a detailed wiring diagram showing elements used in an actual embodiment of the system suggested in FIGURE 5.
Figure 7:
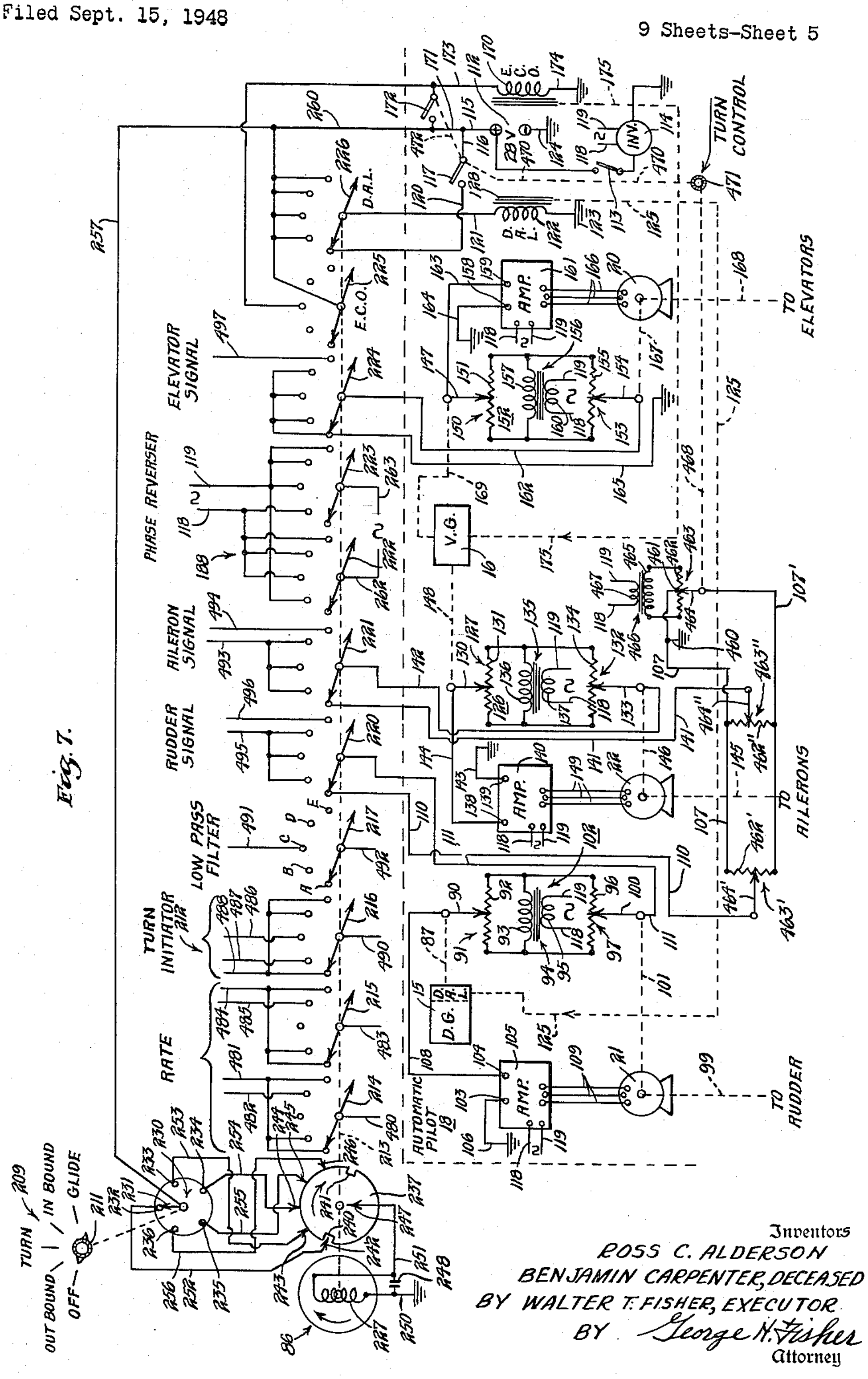
FIGURE 7 is a wiring diagram which, taken together with FIGURE 6, clearly illustrates how the coupling unit controls the automatic pilot.
Figure 9:
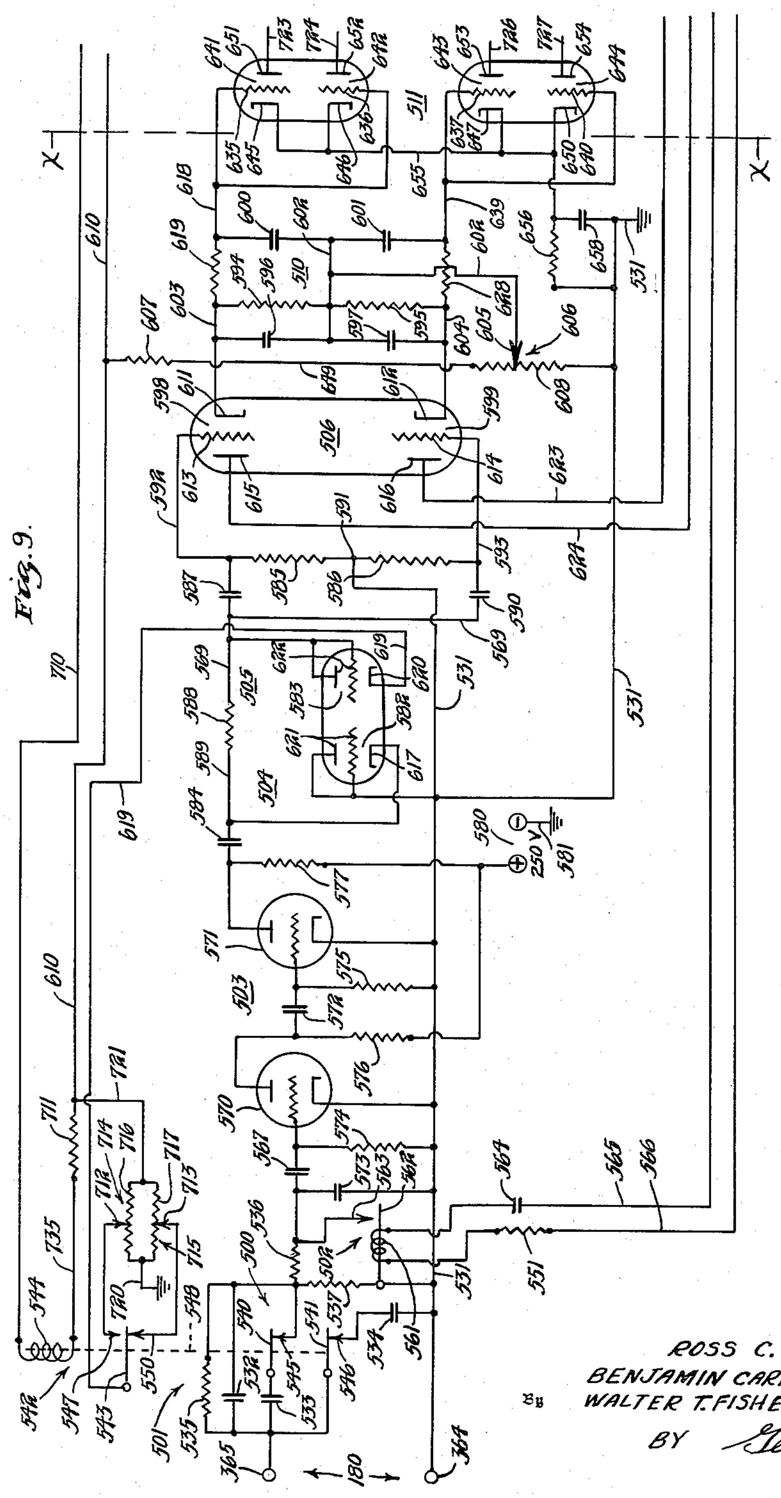
Figure 11:
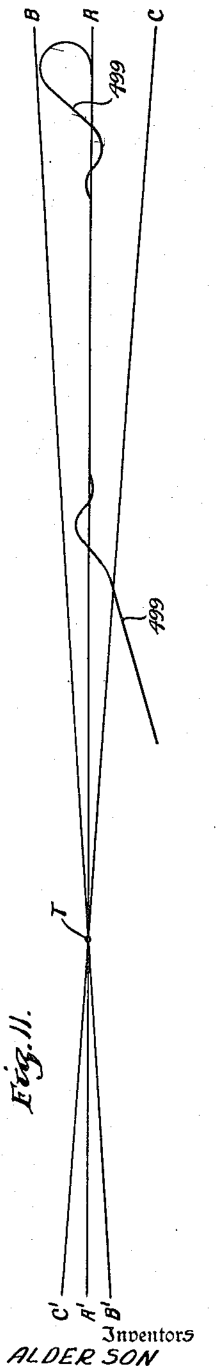
Figure 10:
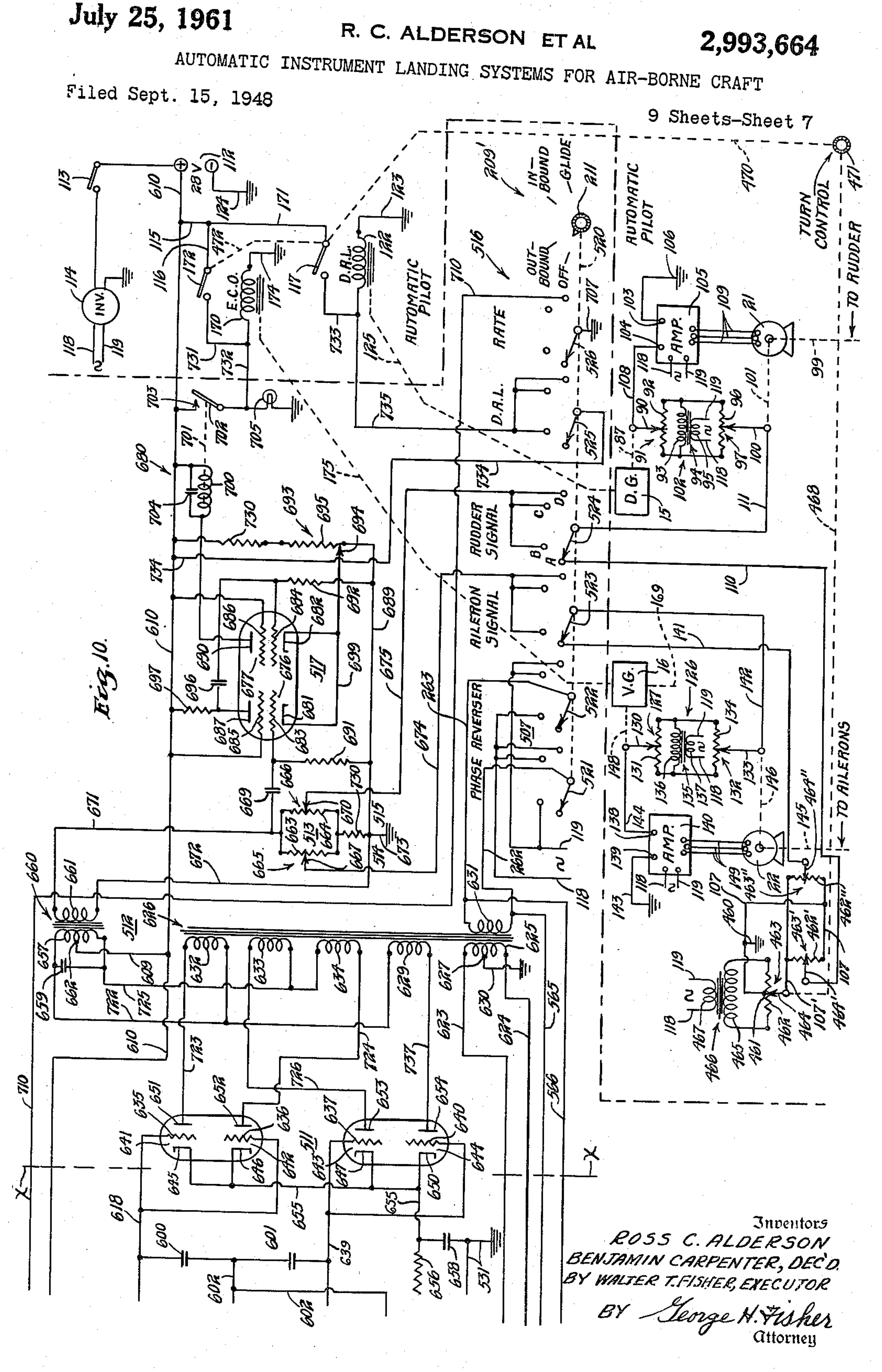
Figure 12:
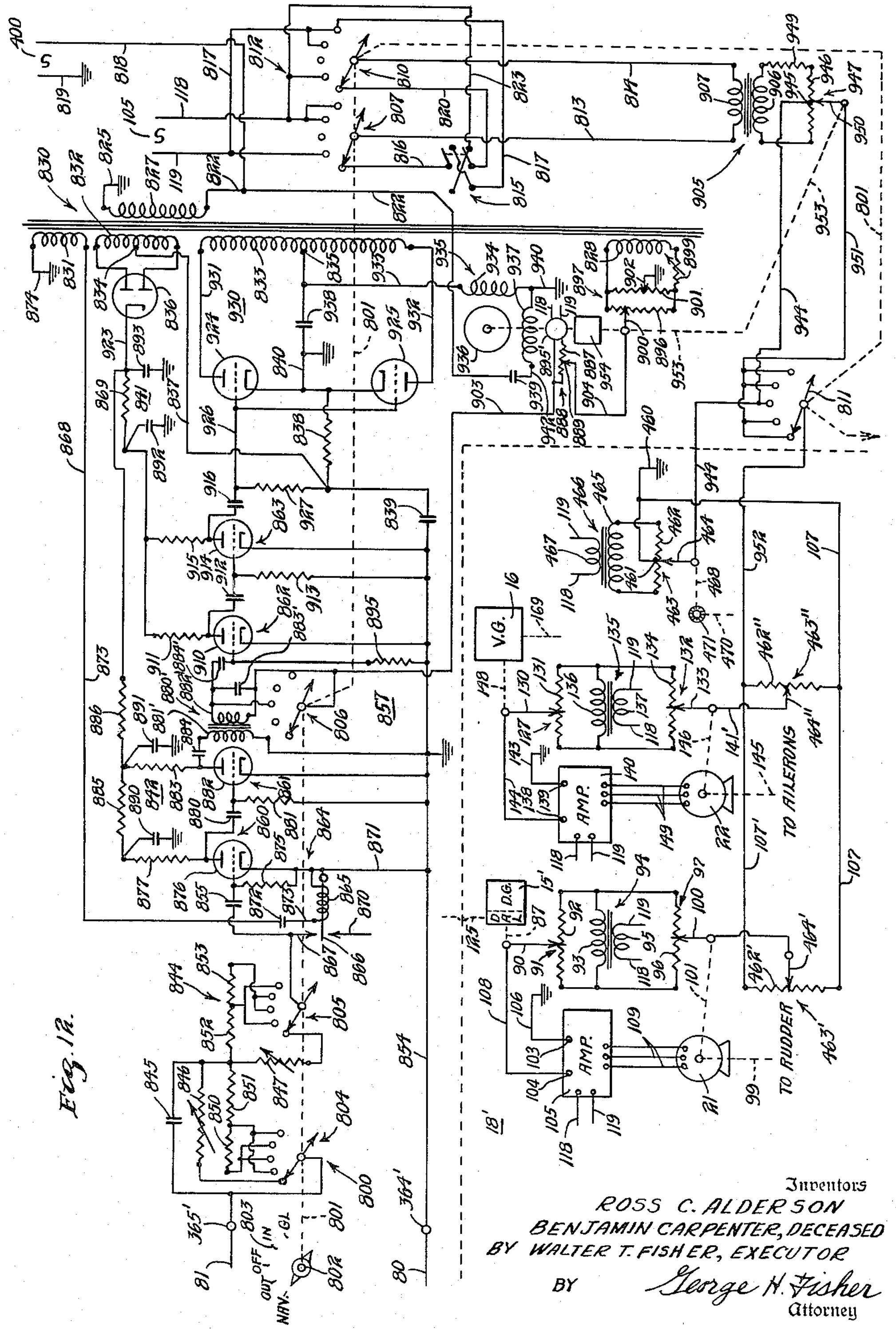
Figure 13:
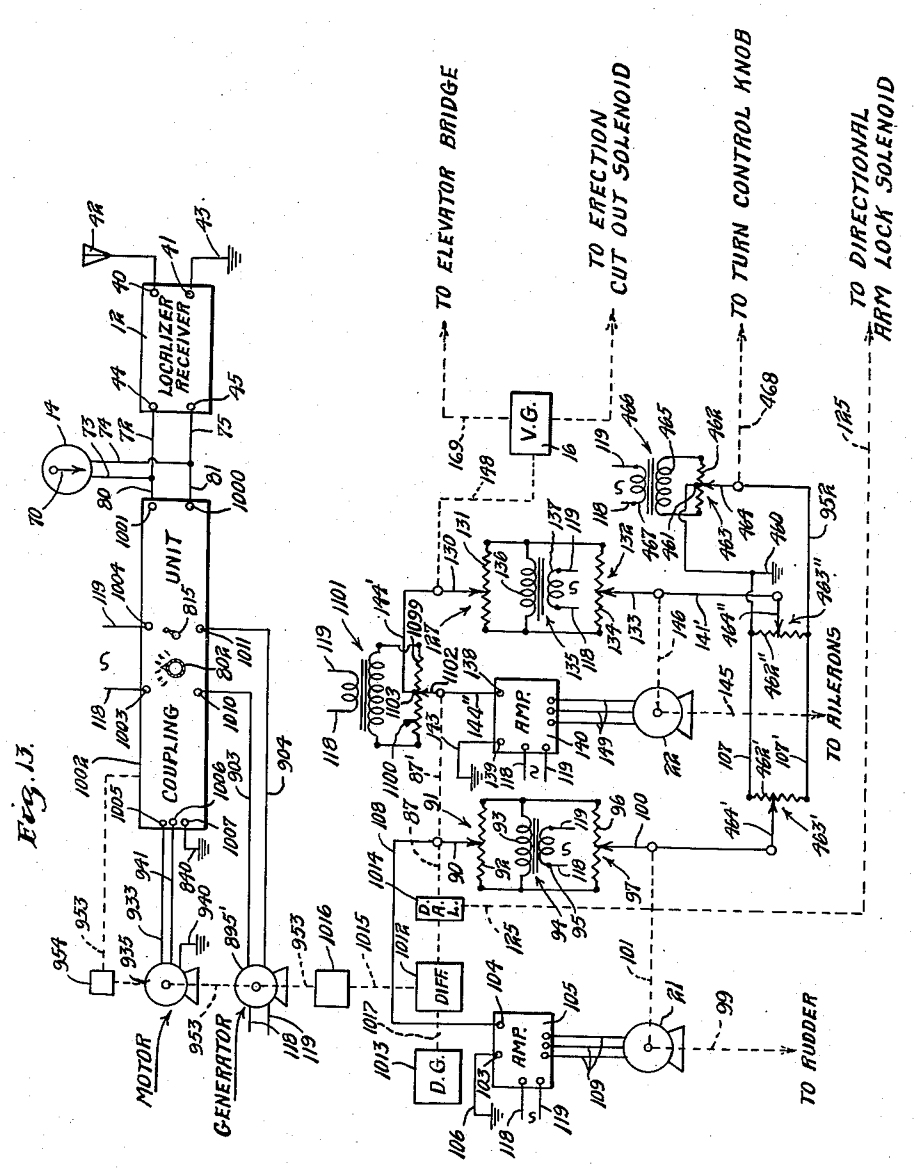

FIGURES 9 and 10 taken together comprise a wiring diagram of an embodiment of this modification of the invention;

FIGURE 11 is a view similar to FIGURE 2 on a larger scale; and showing the type of course followed by a craft equipped with the present invention;

FIGURE 12 is a fragmentary view showing further modifications of the structure of FIGURES 6 and 7; and FIGURE 13 is a schematic showing of a still further modification of this invention.

*General nature of the system*

Figure 1:
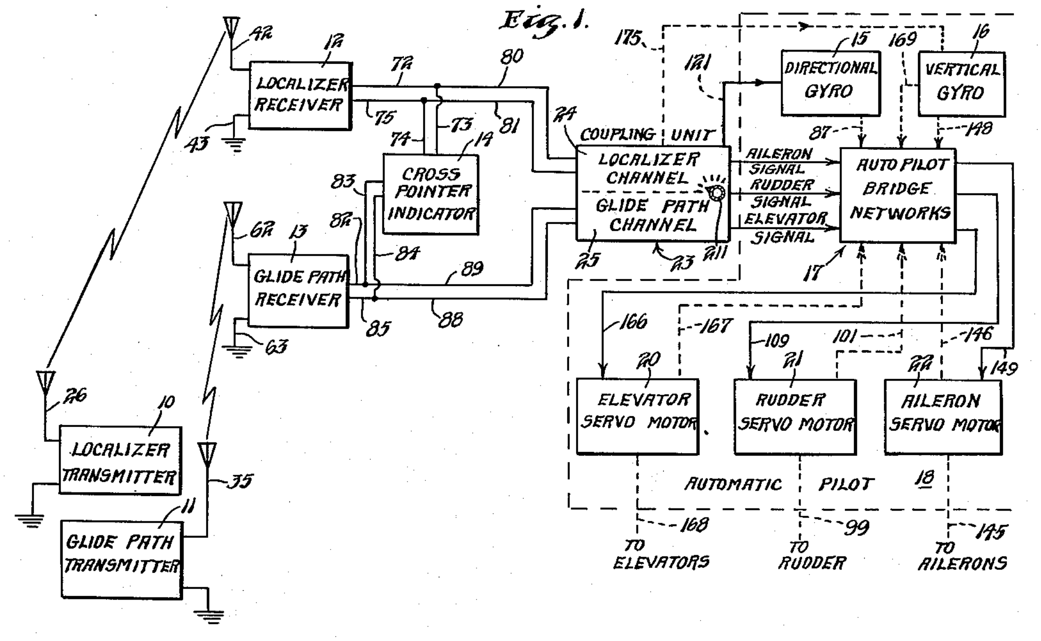
FIGURE 1 is a functional diagram of the complete system.

For an over-all understanding of the invention, reference should now be made to FIGURE 1, in which the localizer transmitter 10 and the glide path transmitter 11, located in the lower left hand portion of the figure, comprise the ground installation of the instrument landing installation: all the remaining elements shown in FIGURE 1 are air-borne. The air-borne components include a localizer receiver 12, a glide path receiver 13 and a cross pointer indicator 14, these components making up the usual indicating type of instrument landing receiver.

In the right hand portion of FIGURE 1 there is disclosed an automatic pilot 18 in which a directional gyroscope 15 and a vertical gyroscope 16 act as standards of attitude and provide signals, indicating departure of the craft from the standard attitude, to the automatic pilot bridge networks indicated generally at 17. These networks energize the elevator servomotor 20, the rudder servomotor 21, and the aileron servomotor 22. As is indicated in FIGURE 1, operation of the various servomotors is effective, not only to bring about change in the attitude of the craft by operating the appropriate control surfaces, but also to rebalance the appropriate bridge networks in the automatic pilot. It should then be emphasized that the word "attitude" is used by those skilled in the art in a restricted sense, associated only with the roll and pitches axes, and in a broader sense, associated with all three axes.

There is also shown in FIGURE 1 a coupling unit 23 which functions to enable the bridge networks shown at 17 to be influenced, in a fashion correlated with the performance of the particular craft, by the output of the localizer receiver 12 and the glide path receiver 13. Coupling unit 23 has a localizer channel 24, to which is connected the output of the localizer receiver 12, and a glide path channel 25, to which is connected the output of the glide path receiver 13. The localizer channel of the coupling unit provides to the bridge networks of the automatic pilot two sets of voltages, one indicative of need for controlling the operation of the aileron servomotor and one indicative of need for controlling the operation of the rudder servomotor, both independently of the usual control exercised by gyroscopes 15 and 16 in the automatic pilot. The glide path channel of the coupling unit provides a single output voltage indicative of need for controlling the elevator servomotor of the automatic pilot.

Before giving a detailed description of the coupling unit and its relationship to the other instrument, it appears desirable to give a little more fully the theory of operation of the instrument landing installation and that of the automatic pilot: their combination in a single operative system is new, and this new combination cannot be perfectly understood without at least a general knowledge of the underlying principles of its components.

*Theory of landing path projection*

The localizer transmitter indicated generally at 10 in FIGURE 1 energizes a complex antenna system 26 to project in space a pair of overlapping fields, one of a carrier frequency of 110 megacycles per second modulated at 90 cycles per second and the other of the same carrier frequency modulated at 150 cycles per second, as shown by the solid curve 27 and the broken curve 30 respectively in FIGURE 2. In that figure it will be seen that there are two points, 31 and 32, at which the strengths of the two fields are equal. At either of these two points a ratio meter responsive to the two field strengths gives a "zero" or one-to-one indication.

FIGURE 2 is laid out to show the curves for a particular value of field strength, since of course the strength of the field radiated by an antenna is at every point influenced by the distance between the antenna and that point. Regardless of what particular value of field strength may be chosen for illustrative purposes, the diagram itself will take the general form shown in FIGURE 2, the lobes being of larger area for a smaller value of field strength and of a smaller area for a larger value of field strength, and varying in specific outline with the arrangement of antenna elements, and so on. For any value of field strength and any specific equipotential outlines, however, the points of intersection of the two equipotential fields lie on a straight line joining points 31 and 32 and passing through the transmitter T, which line has been indicated in the figure by the reference characters TA.

At any point on the line TA a ratio meter responsive to field strength indicates zero, as stated above. As the meter is moved normal to the line TA, in a downward direction, for example, the ratio meter no longer gives a zero indication, but shows an increase in the signal modulated at 90 cycles over the signal modulated at 150 cycles, and this increase in ratio continues until the maximum reading of the meter has been reached. Likewise, if the ratio meter moves normal to the line TA in an upward direction, the indication departs from zero in a direction which shows a predominance of the signal modulated at 150 cycles over that modulated at 90 cycles, and this too continues until an opposite maximum reading of the instrument has been obtained.

It has been found that one embodiment of this system operates satisfactorily when the sensitivity of the meter is so adjusted that its needle moves from its one-to-one ratio indication to its maximum ratio indication when the craft carrying it has deviated in either direction from the line TA by an amount measured by an angle of three and one-half degrees at T: the lines TB and TC indicate the portion of space, about the central path, within which meter 14 is capable of giving a quantitative indication of the amount of departure of the craft from the desired path.

In theory the indication of the meter is strictly proportional to its displacement from the line TA only if the displacement takes place along the arc of a circle about T as a center, as indicated by the arrow 33 in FIGURE 2. Any component in the direction of the transmitter, as indicated by arrow 34, results in change in the strengths of both the 90 cycle modulated carrier and the 150 cycle modulated carrier, and these changes may not be strictly in proportion to the displacement of the instrument from the transmitter. To eliminate this possible variable, each of the receivers includes an automatic volume control circuit which maintains the output of the receiver substantially constant regardless of change in the distance between the instrument and the transmitter.

The ratio of the strengths of the two carriers is of course not affected.

It must be realized that the instrument is not concerned with the heading of the craft, but only with its location. Anywhere within the triangle ATC the instrument indicates that the craft should be turned to the right, so that the normal course of an approaching craft entering the "beam" and following the signal of the blind landing instrument without modification has a pattern indicated by the irregular curve 38.

The instrument is activated by the pilot when the craft is about to enter the beam, and the meter needle swings to one of its stops. As the craft crosses the line TC and enters the beam the needle moves away from its stop, but still indicates that a turn to the right is needed, and this continues until the craft crosses the line TA, at which line the needle has its center zero position indicating a one-to-one ratio. The heading of the craft meanwhile has been changed to the right, however, turning it away from its desired course rather than toward it, so that it continues across the line TA and into the area ATB. Here the instrument indicates the need for a turn to the left, increasing in magnitude as the motion of the craft carries it further from the line TA. The heading of the craft is changed in response to the indication of the instrument, and it crosses the line TA again, this time at a more acute angle: eventually the craft takes the direction AT and holds it. The human pilot ordinarily anticipates the instrument, reducing his change in heading as the instrument indication decreases and thus sharply damping the course oscillation about TA.

There is one complication which must be considered. If an approaching craft enters the beam as indicated by the line 39, the indication given as the line TB is crossed is that the craft is to the right of the desired course and a turn to the left is therefore necessary. If the craft can turn sharply and is moving slowly, the turn may be executed so that the craft does not ever cross the line TA, as shown by the line 39: in such a case the instrument can never give an indication that a turn in the other direction is necessary, and the craft continues to turn in a circle. A strong wind blowing across the beam toward the craft may have the same effect. A system to be fool proof must avoid this defect: this is done according to the present invention in the following fashion.

When the craft is moving normal to the line TA in one direction the rate of change of the localizer receiver output is negative, regardless of which side of the line the craft is located on, and similarly the rate is positive when the craft is moving in the opposite direction. The absolute magnitude of the localizer receiver output however is always positive when the craft is on one side of the line, and always negative when the craft is on the other side of the line. Whenever the craft is moving toward the center of the beam the absolute magnitude and the rate of change of the localizer receiver output are of opposite polarity and the latter may reduce any correction to be caused by the former, even to the extent of reversing it if need be. If the craft is going away from the center of the beam, the absolute magnitude and the rate of change of the localizer receiver output are of the same polarity and the latter may augment any correction to be caused by the former.

The coupling unit includes means adding to the localizer output a signal proportional to its rate of change, in the polarity relationship just recited. By judicious selection of components the relative magnitudes of the displacement and rate components of the modified signal may be adjusted so as to prevent circling as described above, since when the movement of the craft has a component away from the beam, the rate component of the modified voltage increases the correction due to the displacement component. Likewise the arrangement has antihunt properties, since when the movement of the craft has a component toward the beam the rate component of the signal voltage approaches a maximum value which opposes and may exceed that due to the displacement component, and thus cause reverse operation of the controls.

As previously mentioned, the signal to meter 14 simply shows that the craft is on one side or the other of the line TA, regardless of the heading of the craft. An approaching craft is proceeding in a general direction toward the transmitter, and if it is below the line TA as seen in FIGURE 2, a turn to the right is needed to return it to the beam. A departing craft at the same location is proceeding generally away from the transmitter, and in this case a turn to the left is required. The coupler is accordingly provided with means for reversing its response to the receiver output so that the beam can be followed in either direction.

Figure 3:
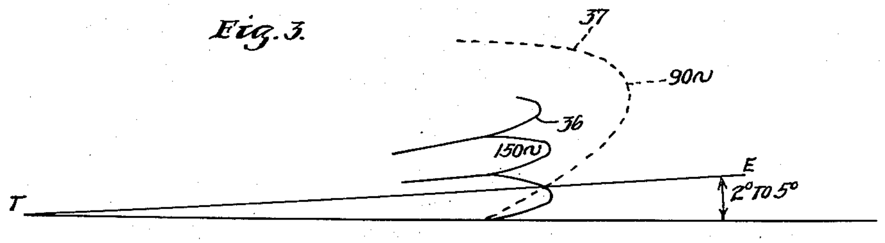

FIGURE 3 illustrates in elevation the fields radiated from the glide path transmitter 11. As shown in FIGURE 1, this transmitter, like localizer transmitter 10, energizes a complex antenna system 35, to project in space a pair of overlapping fields, one of a carrier frequency of 335 megacycles per second modulated at 150 cycles per second, and the other of the same carrier frequency modulated at 90 cycles per second, as shown by solid curve 36 and broken curve 37 in FIGURE 3. In that figure it will be seen that these two curves intersect in the first lobe of curve 36, and by suitably arranging and positioning the antenna arrays, the line TE joining the transmitter with this point of intersection may be made to have any angle within a range of from 2° to 5° with the horizontal as shown in FIGURE 3. Just as in the case of line TA in FIGURE 2, the line TE is a straight line as the field strengths of the two radiations vary with distance. A ratio meter responsive to field strengths in the vertical plane will accordingly give a one-to-one indication only when it is traveling along the line TE. The same reversing signal ratios are obtained when the craft is above or below the line TE as are obtained in the localizer system when the craft is to the left or right of the line TA.

*Receiver construction and operation*

Receivers 12 and 13 will now be described in somewhat more detail, since use is made in this invention of the output from these receivers, and somewhat more specific knowledge of the function of these units will assist in understanding the invention. For this more specific information reference should now be made to FIGURE 4.

Figure 4:
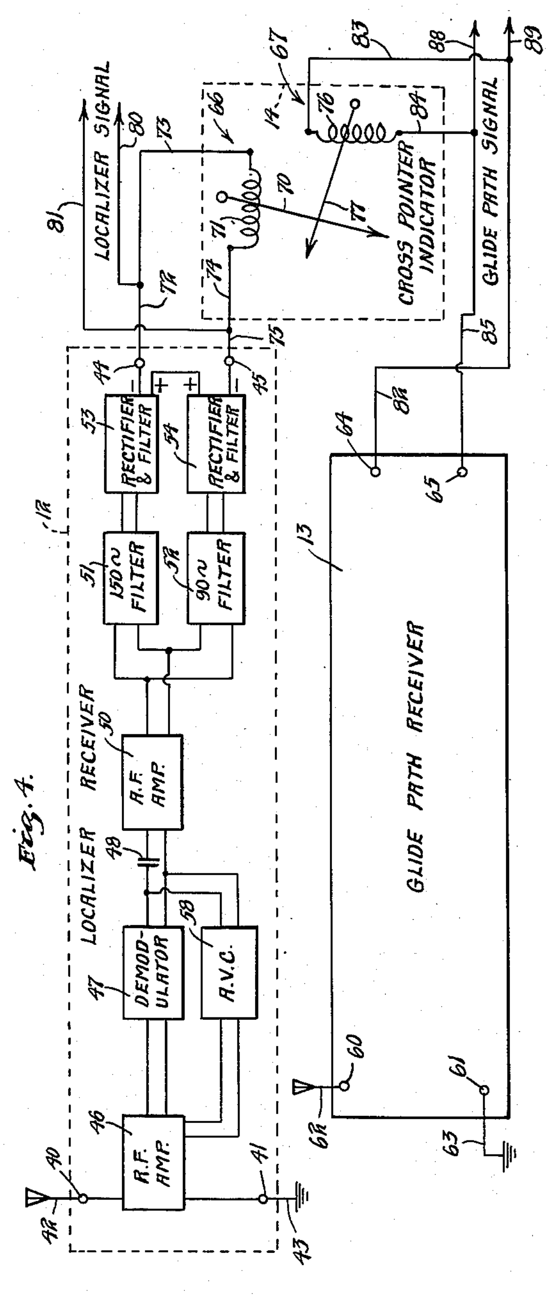
FIGURE 4 is a block diagram showing the functional relationship of the receiving components of an instrument landing installation.

In FIGURE 4 localizer receiver 12 is shown to comprise a pair of input terminals 40 and 41 to which are connected the receiving antenna 42 and a ground connection 43, respectively. A radio frequency amplifier 46 of a suitable number of stages is connected to input terminals 40 and 41, and the output of the radio frequency amplifier is fed through a demodulator 47 and a blocking condenser 48 to an audio frequency amplifier 50, which may also be of any suitable number of stages. While demodulator 47 is customarily a diode detector, any equivalent nonlinear impedance means may be made use of to perform this function.

The output of the audio frequency amplifier 50 is divided and impressed upon a pair of filter circuits, of which that indicated by reference numeral 51 is adjusted to have a low impedance to alternating voltages whose frequency is in the neighborhood of 150 cycles per second, while presenting a high impedance to alternating voltages having a frequency of 90 cycles per second. Similarly, filter 52 is adjusted to have a low impedance to alternating voltages having a frequency of 90 cycles per second, and a high impedance to alternating voltages having a frequency of 150 cycles per second. By this means, the output of audio frequency amplifier 50 is divided into two components whose relative magnitudes are substantially proportional to those of the 90- and 150-cycle components of the radiation received by antenna 42. The output of filter 51 is passed through a rectifier 53 which may also include means producing any desired degree of D.C. smoothing, and the output of filter 52 is passed through a rectifier 54 which may also be provided with suitable smoothing means, so that the outputs of rectifiers 53 and 54 are essentially unidirectional voltages. The rectifiers are connected in series so that their voltages oppose one another, and this series circuit is connected to output terminals 44 and 45 of the localizer receiver.

An automatic volume control 58 is also provided, as discussed above, to maintain the output from the radio frequency amplifier at a substantially constant level regardless of fading or of movement of the craft toward or away from the transmitter.

The localizer receiver operates as follows, it being first assumed that the craft is located somewhere on the equi-signal line TA of FIGURE 2, as at $P_0$. The radiations from the localizer transmitter 10 are picked up by antenna 42 in equal magnitude and impressed upon radio frequency amplifier 46, amplified, and fed to demodulator 47 where the 110 megacycle carrier is removed. The unidirectional component of the demodulator output is fed through the automatic volume control circuit 58 and back to the radio frequency amplifier so as to stabilize its output regardless of change in the distance between the craft and the transmitter. The alternating component of the demodulator output, comprising 90 and 150 cycle components of equal amplitude, is impressed on the audio frequency amplifier 50, and its magnitude is independent of the distance from the craft to the transmitter because of the automatic volume control circuit. The audio frequency amplifier is effective equally on the 90 and 150 cycle components of the demodulated carrier so that the relative magnitudes of these voltages are the same after amplification as they were before, and a complex audio voltage having equal 90 and 150 cycle components is impressed on the inputs of filters 51 and 52.

Because of their electrical nature, filters 51 and 52 present equal, comparatively high impedances to frequencies of 90 and 150 cycles and equal, comparatively low impedances to frequencies of 150 and 90 cycles, both respectively: this results in the application to rectifier-filters 53 and 54, respectively, of alternating voltages of substantially only 150 or 90 cycles and of equal amplitude. Rectifier-filters 53 and 54 are designed to give equal unidirectional output voltages when energized in this fashion, the polarities of these output voltages being as shown in FIGURE 4. Since the two outputs are connected in series to oppose one another, it is evident that because of their equality no resultant output voltage can appear at the output terminals of the receiver.

If the craft is located at some point not on the equi-signal line TA, such as point $P_1$, the radiations from the transmitter do not reach antenna 42 in equal magnitude, that modulated at 90 cycles exceeding that modulated at 150 cycles. The ratio between the strengths of the radiations is unaffected in the radio frequency amplifier, the demodulator, and the audio frequency amplifier, whose output is a complex audio wave having unequal 90 and 150 cycle components, the former exceeding the latter. The voltage output from filter 52 therefore exceeds that from filter 51, and accordingly the unidirectional voltage output of the rectifier-filter 54 exceeds that of rectifier-filter 53, and a voltage appears across terminals 44 and 45 of receiver 12, terminal 44 being positive and terminal 45 being negative.

If the craft is located at point $P_2$ rather than point $P_1$, the radiation modulated at 150 cycles reaching antenna 42 exceeds that modulated at 90 cycles. The receiver operates in a fashion similar to that just described, but this time the unidirectional voltage output from rectifier-filter 53 exceeds that from rectifier-filter 54, and the voltage appearing across terminals 44 and 45 of receiver 12 is now of the opposite polarity, terminal 45 being positive and terminal 44 being negative.

*The glide path receiver*

In FIGURE 4 glide path receiver 13 is shown to comprise a pair of input terminals 60 and 61, to which are connected respectively a receiving antenna 62 and a ground connection 63, and a pair of output terminals 64 and 65. Glide path receiver 13 is in every respect similar to localizer receiver 12 both in structure and operation, except that it is tuned to 335 megacycles rather than 110 megacycles, and its construction will not be given in further detail.

*The cross pointer meter*

Localizer receiver 12 and glide path receiver 13 are both connected to cross pointer indicator 14. This indicator comprises in effect two center-zero voltmeters 66 and 67, arranged in a common housing so that the needle of one may move to the left or right from a normally vertical central position, while the needle of the other may move up and down from a normal horizontal central position. The needles are mounted one behind the other so that each is free to move throughout its entire range without interference from the other.

The needle 70 of meter 14 is displaced from its center position on energization of winding 71 with direct current. If the energizing current is of a first polarity needle 70 is deflected to the left, while if the polarity of the energizing voltage is reversed, the deflection of needle 70 is also reversed, taking place to the right. Winding 71 is energized from output terminals 44 and 45 of localizer receiver 12 by conductors 72 and 73 and conductors 74 and 75, so that when terminal 44 of the receiver is positive the needle 70 is deflected to the left as seen in FIGURE 4.

The needle 77 of meter 14 is displaced from its normally horizontal central position upon energization of winding 76 with direct current, the needle being displaced upwardly when the energizing current has a first polarity and downwardly when the polarity of the energizing current is reverse. Winding 76 is energized from output terminals 64 and 65 of glide path receiver 13 by conductors 82 and 83, and conductors 84 and 85, so that when terminal 64 of the receiver is positive the needle 77 is deflected upwardly as shown in FIGURE 4.

It will be seen that the structure thus far described in connection with FIGURE 4 is simply that of an indicating instrument for pointing out visually to the pilot of a craft that its location with respect to a path projected in space by transmitters 10 and 11, as detected by receivers 12 and 13, is above or below, or to the right or left of, the center of the path. Such a device, while of great utility to human pilots in the control of craft particularly during overcast weather conditions, is without utility for automatically controlling the movement of a craft, since it requires the presence of a human intermediary. This invention, as previously pointed out, centers about the coupling unit 23 by which the voltage outputs of the localizer and glide path receivers, normally used to perform simply an indicating function, are adapted to perform a control function. To this end the output of localizer receiver 12 is connected, in addition to its connection to cross pointer meter 14, to coupling unit 23 by conductors 72 and 80 and conductors 81 and 75, and similarly the output of glide path receiver 13 is also connected to coupling unit 23 by conductors 82 and 89 and conductors 88 and 85. Before describing in detail the structure of coupling unit 23, however, it appears desirable to describe such portions of the structure and operation of the automatic pilot as are necessary to an understanding of the system as a whole. For this purpose, reference should now be made to FIGURES 1 and 7.

*Structure and operation of the automatic pilot*

In FIGURE 7 the automatic pilot 18 is shown in relation to a multi-pole multi-position switch generally indicated by numeral 86 at the left of the figure. This switch is comprised in coupling unit 23, and a general consideration of its structure and function will be postponed until the coupling unit as a whole is being discussed. For the present it need only be remembered that, in the "Off" position of this switch, certain of its contactors maintain in a normal condition circuits in the automatic pilot which require alteration when the latter is to be controlled by the output of the instrument landing instrument.

The usual source of electrical energy in any aircraft is a 28 volt storage battery charged by generators driven by the engines. Such a battery is indicated at 112 in the lower right hand portion of FIGURE 7, and is shown as energizing, through a switch 113, an inverter 114 which supplies alternating electrical energy for the various amplifiers, motors, and transformers comprising the automatic pilot through a pair of conductors 118 and 119. Inverter 114 may indeed be large enough to provide all the alternating voltage for the aircraft, just as the battery 112 may provide all the unidirectional voltage.

*The rudder bridge*

In the automatic pilot a directional gyroscope 15 acts through a "directional arm" or mechanical connection 87 to stabilize the position of the slider 90 of a potential divider 91 whose winding 92 is rigid with the craft and therefore moves with it with respect to stabilized slider 90 when the heading of the craft changes. The secondary winding 93 of a transformer 94, whose primary winding 95 is normally energized from inverter 114 through conductors 118 and 119, is connected to the terminals of winding 92 of potential divider 91, and also to the terminals of the winding 96 of a second potential divider 97, slider 100 of which is mechanically connected as by means 101 to the shaft of a servomotor 21 which will be referred to as the rudder servo: winding 96 is fixed with respect thereto, so that operation of servomotor 21 is effective to vary the position of slider 100 on winding 96.

It will be seen that the structure just recited comprises a normally energized Wheatstone bridge whose input terminals are the terminals of secondary winding 93 of transformer 94, and whose output terminals are the sliders 90 and 100 of potential dividers 91 and 97. The unbalance voltage of this bridge, which will be referred to as the rudder bridge 102, is impressed upon the input terminals 103 and 104 of a normally energized amplifier 105 through a circuit which may be traced from input terminal 103 through ground connections 106 and 460 (the latter located at the lower central portion of FIGURE 7), conductor 107, the upper portion of winding 462' of a potential divider 463', slider 464' of the divider, and conductors 110 and 111, which are electrically connected by a portion of switch 86 as will presently be described, to the slider 100 of bridge 102, and from input terminal 104 of the amplifier by conductor 108 to slider 90 of bridge 102.

Amplifier 105 is of a well known type and energizes motor 21 through conductors 109 for operation in a first direction when the amplifier is energized with alternating voltage of a first phase, and for operation in the opposite direction when the amplifier is energized with alternating voltage of the opposite phase: in each case the motor is energized for operation in such a direction that the resulting motion of slider 100 acts to rebalance bridge 102 and therefore to remove the input signal from the amplifier, whereupon operation of the motor ceases. In addition to moving slider 100, operation of motor 21 is also effective to change the position of the rudder of the craft by a suitable mechanical connection 99 to the rudder. As the craft resumes its normal heading winding 92 is moved toward its normal relation to the position of slider 90, and this unbalances the bridge in the opposite sense, energizing motor 21 to return the rudder to its normal position, and also to recenter slider 100.

Fom the above it will be apparent that the function of this portion of the automatic pilot is to correct any departure of the heading of the craft from a particular one determined by the setting of the directional gyroscope 15. While very helpful in maintaining directed flight, this simple arrangement has the great drawback that it likewise acts to prevent the pilot from bringing about any permanent change in the course of the craft which may become desirable during a flight: any such deliberate change is immediately sensed by the directional gyroscope which unbalances bridge 102 and energizes motor 21 to return the craft to the former course. In order to permit a permanent change in the course of the craft, the system is provided with further elements known as the directional arm lock.

The purpose of the directional arm lock is to permit change in the direction with respect to which gyroscope 15 stabilizes slider 90 of potential divider 91: this is accomplished by temporarily connecting the arm and the winding in a rigid association so that, as the winding turns with the craft, the wiper must move with it, thus maintaining balance in the bridge for the normal position of the rudder. Displacement of the latter to bring about the desired turn is accomplished by separate and independent means actuated, as is the directional arm lock, by a "turn control knob" 471 shown in the lower right corner of the figure and mechanically connected by suitable means 468 to the slider 464 of a potential divider 463, discussed more fully below, and by suitable means 470 to the operating mechanism of a switch 117. The arrangement is such that initial movement of knob 471 in either direction closes switch 117, and motion of knob 471 thereafter displaces slider 464 in one direction or the other, depending on the direction of rotation of the knob.

As previously pointed out, the winding 92 of potential divider 91 is fixed to the craft for turning movement therewith. The directional arm lock functions to releasably clamp arm 87 to the housing of the gyroscope to force it to move unitarily with the craft, thus holding it motionless with respect to winding 92. In order to make this possible without prescessing gyroscope 15 about one of its normally horizontal axes, which would be undesirable, the normal connection between the gyroscope and arm 87 is made through a frictional coupling which transmits from the gyroscope sufficient torque to move slider 90 with respect to winding 92 under all operating conditions of the instrument, but which nevertheless permits slipping to take place between arm 87 and the gyroscope on the application of less torque than the gyroscope rigidity of the instrument is capable of exerting. Accordingly when arm 87 is locked to the gyroscope housing and the craft turns, the gyroscope remains in its original attitude and the clutch slips.

The directional arm lock includes a solenoid having a winding 122 and a movable core or armature 128, the latter being associated by mechanical means 125 with the directional gyroscope 15. The structural details of the directional arm lock are described in detail in the copending application of Willis H. Gille, Serial No. 447,989, filed June 27, 1942, and assigned to the assignee of the present application: these details are therefore not set forth herein. The circuit by which proper operation of the directional arm lock is brought about must be understood, however, since it is affected by switch 86 of the present invention.

The solenoid winding 122 is energized from battery 112 on closure of switch 117 through a circuit which may be traced from the positive pole of the battery through conductors 115 and 116, switch 117, conductors 120 and 121, normally connected by a portion of switch 86, the solenoid, and ground connections 123 and 124 to the negative pole of the battery. Energization of winding 122 moves core 128 and actuates the locking mechanism in directional gyroscope 15 through connection 125: opening of the switch deenergizes winding 122 and frees the directional arm for renewed azimuth stabilization by the gyroscope.

When the directional arm lock is operated wiper 90 is normally clamped at or near its central position, and after the rudder servomotor brings wiper 100 into the corresponding position the rudder position is also fixed by action of the servo system. Turn of the craft may now be brought about by an overriding manual control on the rudder, but in the automatic pilot under consideration this function is accomplished by potential divider 463 under the control of knob 471 as follows.

Conductor 107 is connected to a center tap 461 on the winding 462 of voltage divider 463, and slider 464 of this divider is connected by conductor 107' to the windings 462' and 462'' of voltage divider 463' and a further voltage divider 463''. The winding 462 of voltage divider 463 is energized from the secondary winding 465 of a transformer 466 whose primary winding 467 is energized from inverter 114 through conductors 118 and 119.

As long as slider 464 engages center tap 461, conductors 107 and 107' are at the same potential, and voltage divider 463' acts merely as an impedance in the amplifier circuit of rudder bridge 102. If knob 471 is turned to move slider 464 away from center tap 461, a voltage appears between the slider and ground connection 460 which depends in magnitude and phase on the amount and direction of the displacement of the slider. This voltage is impressed across winding 462' by conductors 107 and 107', and of it a variable portion determined by the position of slider 464' is impressed on amplifier 105 by the circuit previously traced: it acts just as would unbalance of bridge 102 to cause energization of motor 21 which operates until the voltage is exactly balanced by unbalance voltage from the bridge, when the rudder remains stationary while the craft turns. No amount of turn of the craft is capable of rebalancing the bridge, since no member responsive to turn of the craft is now effective upon the bridge because of the operation of directional arm lock 122. The bridge can be rebalanced only by returning slider 464 to its central position, bringing about return of slider 100 to its normal position by reverse operation of motor 21. During the last increment of motion of knob 471 switch 117 is opened, thus returning control of the rudder servomotor to directional arm 87.

*The aileron bridge*

An "aileron bridge" 126 forms a part of automatic pilot 18, and is shown to comprise a first potential divider 127 having a slider 130 and a winding 131, and a second potential divider 132 having a slider 133 and a winding 134, the windings 131 and 134 being connected in parallel to the secondary winding 136 of a transformer 135 having a primary winding 137 normally energized from conductors 118 and 119. The unbalance voltage of bridge 126 is applied to input terminals 138 and 139 of a normally energized amplifier 140 through a circuit which may be traced from input terminal 139 through ground connections 143 and 460, conductor 107, the upper portion of the winding 462'' of potential divider 463'', slider 464'' of the divider, and conductors 141 and 142, which are normally electrically connected by a portion of switch 86 as will presently be described, to slider 133, and from input terminal 138 of the amplifier through conductor 144 to slider 130. Through conductors 149 amplifier 140 energizes servomotor 22, which will be referred to as the aileron servo and which actuates slider 133 of potential divider 132 through a mechanical connection 146. The aileron servo also actuates the ailerons of the craft through a suitable mechanical connection 145. Slider 130 of potential divider 127 is stabilized in space, about the roll axis of the craft, by a first mechanical output 148 from vertical gyroscope 16, so it is evident that the aileron bridge is in every respect similar to the rudder bridge just discussed.

It will be apparent that if sliders 464' and 464'' are equally displaced along their windings, equal portions of any voltage between conductors 107 and 107' will be added in the rudder and aileron bridge circuits. The responsiveness of the craft to control about the turn and roll axes may not be the same, but by adjusting the positions of sliders 464' and 464'' independently it is possible to bring about the relation between the additional voltages required to cause a coordinated turn of the craft. This is the reason for providing voltage dividers 463' and 463''.

*The elevator bridge*

The vertical gyroscope 16 also acts through a second mechanical output 169 to stabilize the slider 147 of a potential divider 150 having a winding 151 which is connected to comprise a part of an "elevator bridge" 152. This bridge has a second potential divider 153 including a slider 154 and a winding 155 connected, in parallel with winding 151, to the secondary winding 157 of a transformer 156 having a primary winding 160 normally energized from conductors 118 and 119. The output of the elevator bridge is connected to the input terminals 158 and 159 of a normally energized amplifier 161 through a circuit which may be traced from input terminal 158 through ground connection 164, and ground connection 165 and conductor 162, which are normally electrically connected by a portion of switch 86 as will presently be described, to slider 154, and from input terminal 159 through conductor 163 to slider 147. Through conductors 166 amplifier 161 energizes servomotor 20, which will be referred to as the elevator servo; this servo actuates slider 154 of potential divider 153 by means of a mechanical connection 167, and controls the elevators through a suitable mechanical connector 168. As is suggested by the presentation in the figure, the stabilizing effect of the vertical gyroscope 16 upon sliders 130 and 147 is about two normally perpendicular axes, the roll and pitch axes of the craft respectively. From the foregoing it will be apparent that elevator bridge 152 is similar to rudder bridge 102 previously described in every respect except that it is unaffected by adjustment of sliders 464' and 464''.

In order that the stabilizing effect of the vertical gyroscope may be properly coordinated with the surface of the earth, the gyroscope is provided with suitable erection means, as is well known to those skilled in the gyroscopic art. It is also well known in that art that erection systems for gyroscopes are peculiarly susceptible to longitudinal and transverse accelerations such as continually occur in aircraft, and that if uncorrected, such accelerations speedily introduce into the stabilized axis of the vertical gyroscope such perturbations and inaccuracies as render it unfit for use. These acceleration forces occur only to a minor and generally compensating extent during straight flight of the craft, but are prominent during any change in its heading. Their effect is overcome in the automatic pilot shown in FIGURE 7 by means, known as the "erection cut-out," which temporarily disables the erection system of the vertical gyroscope when it is desired to change the craft's course.

The disabling means just recited is shown in FIGURE 7 to include a solenoid 170 energizable through a circuit which may be traced from the positive pole of battery 112 through conductors 115 and 171, a switch 172 mechanically connected as at 470 and 472 to turn control knob 471, conductor 173, the solenoid, and ground connections 174 and 124. Solenoid 170 is effective, upon being energized, to disable the erecting means in the vertical gyroscope 16 by a connection 175 which may be mechanical in the case of a pneumatically or mechanically erected gyroscope or electrical in the case of an electrically erected gyroscope. Switches 117 and 172 are arranged, as is shown in FIGURE 7, for simultaneous operation by turn control knob 471, since whenever it is desired to change the course of the craft it is necessary both to lock directional arm 87 and to disable the erection system of the vertical gyroscope. The erection system and erection cut-out of vertical gyroscope 16 are shown in the copending application referred to above: the showing will therefore not be repeated here.

The foregoing brief description of the automatic pilot should make its construction and operation sufficiently apparent for the purpose of understanding the present invention. A study of FIGURE 7 will at once make it evident that the application of additional voltages between conductors 110 and 111, 141 and 142, and 162 and 165, is sufficient to energize the respective amplifiers independently of any previous unbalance of the respective bridges. The additional voltages may moreover be balanced out by suitable opposite unbalancing of the bridges, so that each gives a resultant zero signal to its amplifier, if the independent voltages are of the same frequency as those supplied by the respective bridge transformer secondary windings, and in exact phase opposition to the voltages produced by movements of the motor driven sliders in one direction or the other. Coupling unit 23 is designed to provide such additional voltages to control the operation of the rudder, aileron and elevator servomotors, independently of the control by the directional and vertical gyroscopes, in accordance with signals supplied by the blind landing receivers as the craft follows or departs from the path in space electromagnetically projected by the localizer and glide path transmitters of the instrument landing installation.

*Functions of the coupling unit*

Figure 5:
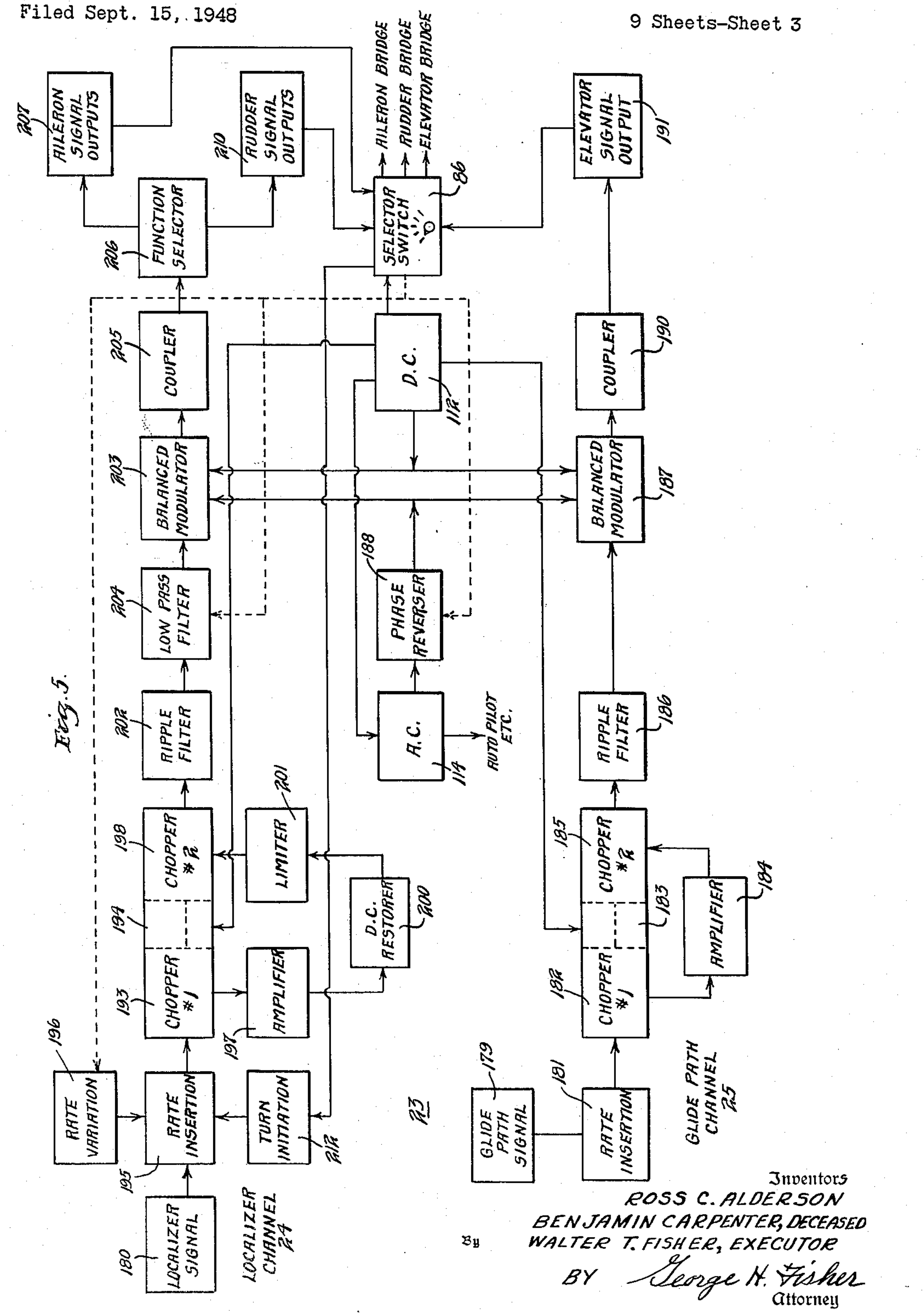
FIGURE 5 is a similar diagram of the components of a coupling unit for connecting the instrument landing receiver with the automatic pilot.

The coupling unit shown at 23 in FIGURE 1 is illustrated in complete detail in FIGURES 6 and 7, but will probably be more easily understood if reference is first made to FIGURE 5 which is a simplified functional diagram of the components making up the coupler. From FIGURE 5 it will be apparent that the coupling unit comprises two channels, the glide path channel 25 and the localizer channel 24, which are entirely independent, except that they are supplied by common sources of alternating and direct current, and that a single mechanical selector means is provided to control their output. The glide path signal indicated at 179 in FIGURE 5 is that supplied by conductors 88 and 89 in FIGURE 4, and similarly the localizer signal indicated at 180 in FIGURE 5 is that supplied by conductors 80 and 81 in FIGURE 4. Since the glide path channel 25 of coupling unit 23 is the simpler of the two channels, it will be considered first.

The unidirectional voltage from the guide path signal 179 is applied to a rate insertion circuit 181 which is not effective so long as the glide path receiver signal is of constant magnitude, but which acts when the glide path receiver signal varies in magnitude to oppose the variation. The output of the rate insertion circuit is applied to a chopper 182 comprising one set of interrupting contacts of a vibrator 183, which is maintained in operation by energy from the battery 112. The resulting square wave is amplified in amplifier 184, to raise its level, since the voltage output at the terminals of the glide path receiver is very small. The output of amplifier 184 is applied to a second chopper 185 comprising a second set of interrupting contacts in vibrator 183. Amplifier 184 is constructed so that there is a minimum of phase shift in the voltage passing through it, and therefore since the blades of the two choppers move in synchronism it is possible to derive from the output of the second chopper a pair of voltages which are of opposite polarity with respect to ground, chopper number 2 reversing the direction in which it completes its output circuit simultaneously with passing of the square wave output of amplifier 184 through zero. The output of chopper number 2 is fed through a ripple filter 186 to the input of a balanced modulator 187, energized with alternating voltage from source 114 through a phase reverser 188, whose purpose will presently be described. The output of modulator 187 is according to conventional practice an alternating voltage which varies in magnitude and reverses in phase with variation in the magnitude and reversal in the polarity of the unidirectional voltage on the input of the modulator. This alternating voltage is fed to a coupler 190 and the elevator signal output 191 derived therefrom is fed through selector switch 86 to the elevator bridge of the automatic pilot.

The localizer channel 24 of the coupling unit is basically the same at the glide path channel 25 just discussed, but includes certain refinements required by the more exacting specifications to be met. As before, the signal is fed to a first chopper 193 comprising a portion of a vibrator 194, energized from battery 112, through the intermediary of a rate insertion circuit 195 which is ineffective so long as the localizer signal is of constant magnitude, but which acts, when the localizer signal varies in magnitude to oppose the variation. In the localizer channel, however, the relative magnitude of this opposition to a given change in the localizer signal voltage is regulated by a rate variation unit 196. The output of chopper 193 is amplified in amplifier 197, but the output of the amplifier instead of being fed directly to the second chopper 198 of interrupter 194 is first fed through a D.C. restorer 200 and a limiter 201. The output of chopper 198 is filtered in ripple filter 202, as before, and the resulting unidirectional potential is fed to a balanced modulator 203, which is similar to modulator 187, through a low pass filter 204. The latter has been found desirable because under certain conditions response of the coupling unit to rapidly varying signals from the localizer receiver is a disadvantage rather than an advantage, leading as it may to excessive control in the complete system. The alternating output voltage of the modulator is fed through a coupler 205 as before, and divided in a function selector 206 to provide signal outputs of suitable relative magnitude which are indicated at 207 and 210. Like the elevator signal output, these outputs are fed through selector switch 86, and supply the aileron and rudder bridges of the automatic pilot. It has been found that the modulators used in this coupler operate more satisfactorily over a particular range of their plate voltage, and accordingly a unidirectional voltage from battery 112 is maintained on the plates of the modulator tube in addition to the usual alternating voltage energization.

*Structure and operation of the coupling unit selector switch*

The principal control of coupling unit 23 (see FIGURE 7) is a switch 86 actuated upon operation of a manual knob 211 which may take any one of five positions with respect to a graduated scale 209 This switch functions as follows. In the "Off" position of the switch the instrument landing system is entirely disconnected from the automatic pilot which functions in its normal fashion. In the "Outbound" position of the switch the instrument landing system is connected to the automatic pilot in such a fashion as to cause the craft to follow the beam outwardly away from the transmitter. In the "Turn" position of the switch, the craft performs a 180° turn to the left so that it is prepared to proceed along the beam in the opposite direction. In order to make certain that the craft always turns in the same direction, there is provided as shown also in FIGURE 5 a turn initiator 212 which acts to apply to the input of the coupler, for a certain length of time, a voltage of a selected polarity derived from battery 112, which is of greater magnitude than any signal to be expected from the output of the localizer receiver. In the "Inbound" position of the switch the instrument landing system is connected to the atuomatic pilot in a proper sense to cause the craft to follow the beam in toward the transmitter. In the "Glide" position of the switch the control of the instrument landing system is extended so that it includes the elevator bridge as well as the aileron and rudder bridges of the automatic pilot. It will be realized that in addition to the localizer and glide path transmitters shown in FIGURE 1, preferred operation of this system makes desirable the conventional marker beacon transmitters and receiver which are already known as a part of this system.

Inasmuch as the switch 86 is effective in all portions of the coupling unit, the details of the switch will now be given, reference being made to FIGURE 7. The switch is seen to comprise a shaft 213 arranged for rotation about its axis. Mounted on but insulated from shaft 213 are a plurality of switching arms or contactors 214, 215, 216, 217, 220, 221, 222, 223, 224, 225 and 226. Associated with each contactor is a bank of five fixed contacts so arranged that when the switch is rotated through equal increments the contactors are moved from one set of fixed contacts to the next. The movement of the contactors is always in the same clockwise direction, as indicated by the arrow in the figure, and by reason of the fact that the arms are double ended, the next increment of movement after one end of a contactor has reached the extreme clockwise contact brings the other end of the contactor into contact with the extreme counterclockwise contact.

In order to avoid complicating the drawing with a mass or reference characters, the following method of referring to the various contacts will be uniformly followed in the description of this coupling unit. Each contact will be identified by the number of its bank, which is the number of the switching arm, and a letter suffix of which the letter A refers to the most counterclockwise contact in the bank, B to the contact next clockwise to it, etc. This has been illustrated in connection with bank 217 only, where the various contacts are lettered A, B, C, D and E.

Banks 214 and 215 of switch 86 constitute rate variation unit 196 and are associated with the rate insertion circuit 195 of the localizer channel, bank 216 with the turn initiation circuit 212, and bank 217 with the low pass filter circuit 204, all functionally indicated in FIGURE 5 and shown in detail in FIGURE 6 as will presently be discussed. Banks 220, 221 and 224 of switch 86 determine the distribution of signals from the coupling unit to the automatic pilot. Banks 226 and 225 of switch 86 provide for control of solenoids 122 and 170 independent of their normal controlling switches 117 and 172 respectively.

Banks 222 and 223 of switch 86 cooperate to function as phase reverser 188. Electrical energy from inverter 114 is applied by conductor 118 to fixed contacts C, D and E of bank 222 and fixed contact B of bank 223, and by conductor 119 to fixed contact B of bank 222 and fixed contacts C, D, E of bank 223; conductors 262 and 263, connected respectively to contacts 222 and 223, provide voltage output. When contactors 222 and 223 are on contacts A, no alternating voltage is transmitted from conductors 118 and 119 to conductors 262 and 263. When contactors 222 and 223 are in their B positions, alternating voltage of a first phase relationship is transmitted from conductors 118 and 119 to conductors 262 and 263, while when contactors 222 and 223 are in their C, D or E positions, alternating voltage of the opposite phase is transmitted through the reverser.

Shaft 213 of switch 86 is rotated, in the direction shown, by an electric motor 227, which may conveniently be a stepping or ratchet type of motor, under the control of a switch 230, actuated by manual knob 211. Switch 230 includes a movable contact arm 231 and a plurality of fixed contacts 232, 233, 234, 235 and 236. Switch 230 is electrically connected to motor 227 through means including a conducting disk 237 mounted on and insulated from shaft 213 and having diametrically opposite notches 240 and 241. One terminal of motor 227 is grounded as at 250, the other end is connected as by conductor 251 with a wiper 247 which maintains contact with disk 237 regardless of its rotated condition.

A plurality of further wipers 242, 243, 244, 245 and 246 are arranged around disk 237 in the same angular fashion as are contacts A, B, C, D and E arranged about their respective contactors. The arrangement is such that when the contactors engage their contacts A, disk 237 is engaged by wipers 243, 244, 245 and 246, but is not engaged by wiper 242. In a similar fashion when the wipers engage their contact B, disk 237 is engaged by all wipers except 243, etc. Wiper 242 is connected with contact 232 of switch 230 by a conductor 252, wiper 243 with contact 233 by conductor 253, wiper 244 with contact 234, by conductor 254, wiper 245 with contact 235 by conductor 255 and wiper 246 with contact 236 by conductor 256. Contact arm 231 of switch 230 is connected to the positive pole of battery 112. A condenser 248 is connected across motor 227 to absorb inductive surges.

In the condition of the switches shown in FIGURE 7 there is no complete circuit energizing motor 227. However, if manual knob 211 is turned from "Off" to "Outbound," contact arm 231 moves from contact 232 to contact 233, and motor 227 is energized, through a circuit which may be traced from the positive pole of the battery through conductors 115, 171, 260 and 257, contactor 231, fixed contact 233, conductor 253, fixed contact 243, disc 237, contact 247, conductor 251, motor 227, and ground connections 250 and 124, to operate until notch 240 moves into alignment with contact arm 243. If manual knob 211 is rotated in the opposite direction, from "Off" to "Glide," motor 227 is again energized to operate in the same direction and this operation continues until notch 241 comes into alignment with wiper 246. For any other setting of knob 209 similar action takes place, the motor always operating the switch in a clockwise direction until alignment is attained regardless of the direction of movement of knob 209. Banks 214, 215, 216 and 217 of switch 86, and conductors 262 and 263, appear in FIGURE 6, to which reference should now be made.

*The coupling unit glide path channel*

The glide path signal 179 is applied to the glide path channel 25 of the coupling unit at terminals 264 and 265, the former being connected to a ground bus 266, as shown in the figure. The following description assumes that switch 86 is in its C position. The rate insertion circuit 181 for the glide path channel includes capacitor 267 and resistors 270 and 271. Unidirectional voltage from battery 112 is supplied to coupling unit 23 at terminals 272 and 273, the latter being negative and connected to the ground bus 266 as shown.

After modification in the rate insertion circuit, the voltage is coupled by a capacitor 280 to the grid of the first stage of amplifier 184, with which is associated the first chopper 182 of vibrator 183. The vibrator has an energizing winding 274 which is connected to battery 112, and operates at a normal frequency of about 100 cycles per second. Chopper 182 includes a blade 275 and stationary contacts 276 and 277: in the normal condition of the vibrator, blade 275 is in contact with fixed contact 276, completing the circuit for flow of electrical energy from the battery 112 through winding 274. When such a flow takes place, blade 275 is drawn away from contact 276 in engagement with fixed contact 277: in this position it forms a short circuit across amplifier 184, connecting the input lead to the ground bus.

Amplifier 184 comprises a first triode 281 and a second triode 282 connected to form a conventional cascade amplifier having resistance-capacitance coupling. A by-pass condenser 283 is connected across the grid resistance 284 of triode 281 to minimize the effect of high frequency transients on the amplifier: it was not found necessary to by-pass the grid resistor 285 of triode 282. Anode voltage is provided to the plates of the triodes through plate resistors 286 and 287; the interstage coupling capacitor is identified by the reference numeral 290. The output of amplifier 184 is connected through a coupling capacitor 291 and the vibrating blade 292 of chopper 185, which moves between fixed contacts 293 and 294 synchronously with the movement of blade 275 of chopper 182, and is supplied to ripple filter 186. The ripple filter is arranged for full wave operation, and is comprised of capacitors 295, 296, 297, and 298 and resistors 300, 301, 302 and 303. The input conductors 304 and 305 of the ripple filter are connected to fixed contacts 293 and 294 of chopper 185, and the output conductors 306 and 307 of the ripple filter provide unidirectional voltage to the balanced modulator which follows: a ground connection 308 is provided in the ripple filter to complete the circuit to the modulator tubes.

Balanced modulator 187 is shown to comprise triodes 310, 311, 312 and 313 and a transformer 314 having a primary winding 315 and a pair of secondary windings 316 and 317 having center taps 318 and 319 respectively. The output of modulator 187 is fed to coupling unit 190 comprising a transformer 329 having a primary winding 320, center tapped at 328, and a secondary winding 321: a capacitor 322 is connected across primary winding 320 to adjust the phase of the output voltage. The output of the secondary winding 321 is impressed upon a series circuit comprising a fixed resistor 323 and the winding 324 of a potential divider 325 having a slider 326. One terminal of winding 324 is grounded as at 327, and the elevator signal output from the glide path channel 25 of coupler 23 appears between slider 326 and ground connection 327.

The power supply for coupler 23 includes a transformer 330 having a primary winding 331 energized from conductors 262 and 263. Transformer 330 has a high voltage secondary winding 332, center tapped as at 333, which energizes the anodes of a pair of diodes 336 and 337 connected to comprise a full wave rectifier, whose output is fed through a graded resistance-capacitance filter 339 including capacitors 340, 341, 342 and resistors 343 and 344. By this construction the most thoroughly filtered D.C. is provided for the anode of triode 281 comprising the first stage of the amplifier, while the voltage for triode 282 comprising the second stage of the amplifier, although less thoroughly filtered, is still sufficiently smooth for this use. The triodes comprising balanced modulator 187 are provided with negative bias on their respective grids by biasing resistor 345 in the common cathode conductor 346: a suitable by-pass capacitor 347 is connected across biasing resistor 345.

If there is no signal output from the glide path receiver to the coupling unit, input terminals 264 and 265 of the glide path channel of the coupling unit 23 are at the same potential and the grid of triode 281 remains at cathode potential regardless of the operation of chopper 182. The output of the filter 186 is therefore zero, the grids of the modulator triodes are all at a potential with respect to their cathodes which is determined only by bias resistor 345, and, since the triodes are selected for electrical equality, the anode currents in all of them are equal. To make this clear the plate circuits of the various triodes will now be traced.

The plate circuit of triode 310 may be traced from plate to cathode of the triode, thence to conductor 346, bias resistor 345, ground bus 266, terminal 273, battery 112, terminal 272, conductors 348 and 349, center tap 328 of transformer 329, the lower half of primary winding 320, conductor 358, center tap 318, the upper half of secondary winding 316, and conductor 359 to the plate of the triode.

The plate circuit of triode 311 may be traced from plate to cathode of the triode, thence through conductor 346, bias resistor 345, ground bus 266, terminal 273, battery 112, terminal 272, conductors 348 and 349, center tap 328 of transformer 329, the upper half of primary winding 320, conductor 360, center tap 319, the upper half of secondary winding 317, and conductor 361 to the plate of the triode.

The plate circuit of triode 312 may be traced from plate to cathode of the triode, thence through conductor 346, bias resistor 345, ground bus 266, terminal 273, battery 112, terminal 272, conductors 348 and 349, center tap 328 of transformer 329, the lower half of primary winding 320, conductor 358, the lower half of secondary winding 316, and conductor 362 to the plate of the triode.

The plate circuit of triode 313 may be traced from plate to cathode of the triode, thence to conductor 346, bias resistor 345, ground bus 266, terminal 273, battery 112, terminal 272, conductors 348 and 349, center tap 328 of transformer 329, the upper half of primary winding 320, conductor 360, center tap 319, the lower half of secondary winding 317, and a conductor 363 to the plate of the triode.

From the above it follows that whenever triode 310 or triode 312 discharges, current flows downward in the lower half of primary winding 320, and whenever triode 311 or triode 313 discharges current flows upward in the upper half of primary winding 320; however, triode 310 and triode 312 cannot discharge at the same time, because their anodes are at opposite instantaneous alternating potentials with respect to their cathodes, and triodes 311 and 313 cannot discharge simultaneously for the same reason. In the absence of differential bias on the various control grids, triodes 310 and 311 discharge equally during a first half cycle of the source supplying transformer 314, producing equal and opposite currents in primray winding 320 and therefore giving zero output from secondary winding 321. During the next half cycle triodes 312 and 313 discharge equally, again providing equal and opposite currents in primary winding 320 and giving zero output from secondary winding 321.

It will now be apparent that, for a zero signal into the glide path channel 25 of coupler 23, no output signal is obtained between slider 326 and ground connection 327.

Suppose now that a signal is being supplied to the coupling unit from the glide path receiver such that terminal 265 is positive with respect to terminal 264. Then each time blade 275 of chopper 182 moves away from fixed contact 277 the grid of triode 281 is made positive with respect to its cathode: a square wave is accordingly transmitted through amplifier 184. Since the amplifier has an even number of stages, the voltage on blade 292 of chopper 185 is positive when the grid of triode 281 is positive; at this time blade 292 is in an engagement with fixed contact 294. When the vibrator reverses so that the grid of triode 281 is grounded, blade 292 is at its lowest potential, and is engaged with fixed contact 293. There is thus impressed across the series circuit comprising resistors 300, 302, 303 and 301, a voltage such that conductor 306 is positive, and conductor 307 negative, with respect to ground, which is mid-way between them. The action of ripple filter 186 is such as to suppress the alternating components of this voltage and give a substantially constant unidirectional output whose magnitude is proportional to the input voltage at terminals 264 and 265. The grids of triodes 311 and 312 are therefore more negative and those of triodes 310 and 313 less negative, compared to their cathodes, than when no signal is applied to the amplifier.

As a result of these altered grid voltages, the discharge of triode 310 is greater than before and that of triode 311 is less than before, so that for a first half cycle of the alternating plate voltage the current flowing downward in primary winding 320 exceeds that flowing upward. In the next half cycle the discharge of triode 313 is greater than before and that of triode 312 is less than before, so that the current flowing upward in primary winding 320 exceeds that flowing downward. As the result of this, an alternating voltage of a first phase is induced in secondary winding 321.

If the signal from the glide path receiver is such as to make terminal 265 negative with respect to terminal 264, the system operates in general in the same fashion, but this time conductor 306 is negative with respect to conductor 307. The discharge of triode 310 is now less than before and that of triode 311 is greater than before, so that for a first half cycle of the alternating plate voltage the current flowing upward in primary winding 320 exceeds that flowing downward. In the next half cycle the discharge of triode 313 is less than before and that of triode 312 is greater than before, so that the current flowing downward in primary winding 320 exceeds that flowing upward. As a result of this an alternating voltage is induced in secondary winding 321, of the opposite phase of that induced when the glide path signal is of the first polarity.

The glide path coupler is thus shown to provide an alternating voltage output which reverses in phase with reversal in the polarity of a unidirectional voltage applied thereto, the two phases being in 180° relationship and one of them being in phase with the secondary voltage of the transformer. If the unidirectional voltage varies in magnitude, a similar change is brought about—although opposed by the rate insertion circuit—in the amplitude of the alternating voltage output, since the potentials on the grids of the modulator triodes vary with the input voltage and regulate the amplitude of the alternating voltage output.

*Coupling unit localizer channel*

The localizer signal 180 is applied to input terminals 364 and 365 of the localizer channel 24 of coupling unit 23: as before, one of the input terminals, 364, is grounded. The following description of the circuit assumes the position of switch 86 in which all the contactors are in their B positions. Under these conditions, the rate insertion circuit 195 of the localizer channel comprises a capacitor 367 and a pair of resistors 370 and 371. The output of the rate insertion circuit is applied to one chopper 193 of a vibrator type interrupter 194 having a coil 374 energized from battery 112 for operation at a frequency of about 100 cycles per second. Chopper 193 includes a vibrating arm 375 and a pair of stationary contacts 376 and 377: this vibrator operates in the same fashion as does vibrator 182 previously described. The chopper circuit is coupled by means of a coupling capacitor 380 to amplifier 197 comprising a pair of triodes 381 and 382. A by-pass capacitor 383 is connected across the grid resistor 384 of the first stage of this amplifier while the grid resistor 385 of the second stage is found not to require by-passing. The anode of triode 381 is provided with the most completely filtered unidirectional voltage of the power supply through resistor 386, and the anode of triode 382 is provided with less filtered unidirectional voltage from the power supply through resistor 387, in a manner analogous to the power supply for the amplifier 184 in the glide path circuit. As before the amplifier is resistance-capacitance coupled, the coupling capacitor being identified by the reference numeral 390. The output of amplifier 197 is transmitted by coupling capacitor 391 to the movable contact 392 of the second chopper 198 comprised in vibrating interrupter 194, but the signal is altered by the influence of a triode 200 connected to act as D.C. restorer and a further triode 201 connected to act as a limiter: the altering circuit includes a resistor 350.

The additional complication of the system caused by components 200 and 201 is introduced in the localizer channel 24 and not in the glide path channel 25 because larger signals are need from the localizer channel. The glide path channel is used only when the craft has assumed a position in attitude and a direction of motion which at worst are not very far from those desired, as will later be explained in detail, but in the normal use of the system there is a considerable range of variation within which the localizer channel must control the craft. This requires a larger available power output from the localizer channel and also a more perfect full-wave form for the amplifier output wave: although this could be accomplished by a pair of limiters it is considered preferable to use one D.C. restorer and one limiter so as to require one rather than two bias voltage supplies.

The square wave output from triode 382 after passing through coupling capacitor 391, alternates about a central value which is the same as ground potential. The effect of D.C. restorer 200 is to alter this wave so that it alternates about a central positive value compared to ground potential, by dropping the lower half of the square wave. As a result, it is thereafter necessary to use a single limiter to clip only one side of the wave, and the number of bias voltages is accordingly reduced.

The cathode of limiter triode 201 is maintained at a biasing potential with respect to its anode by being connected between resistors 352 and 353 of a voltage divider including further resistors 351 and 354, the latter being grounded and the former being connected by means of conductor 348 to the positive terminal 272 of battery 112. Thus, the voltage drop in resistors 354 and 353 serves as a source of positive biasing voltage for the cathode of limiter triode 201.

Blade 392 of chopper 198 moves between fixed contacts 393 and 394, connected to the input conductors 404 and 405 of ripple filter 202, which is shown to comprise capacitors 395, 396, 397 and 398 and resistors 400, 401, 402 and 403. The output of the ripple filter is fed to the grids of balanced modulator 203 by conductors 406 and 407.

Modulator 203 is shown to comprise triodes 410, 411, 412 and 413 and a transformer 414 having a primary winding 415 energized from conductors 262 and 263 and a pair of secondary windings 416 and 417 having center taps 418 and 419, respectively. The grids of the modulator tubes are given a negative bias by biasing resistor 355, in the common cathode lead 356, which is by-passed by a capacitor 357. The output of modulator 203 is fed to coupler 205 which is shown to comprise a transformer 429 including a primary winding 420 center tapped as at 428' and a secondary winding 421: a capacitor 422 is connected across primary winding 420 to adjust the phase of the output voltage. The output of secondary winding 421 is connected through a resistor 428 across a pair of series circuits, the first comprising the windings 423 and 424 of a pair of potential dividers 425 and 426 having sliders 427 and 430, and the second including the windings 431 and 432 of a pair of potential dividers 433 and 434 having sliders 435 and 436. One side of this pair of circuits is grounded as at 437.

Potential dividers 426, 425, 433 and 434 comprise function selector 206, and operate to derive from the output of transformer 429 a plurality of voltages which may have any desired ratio so that the signals applied to the ailerons and rudder may be of the relative magnitudes found most satisfactory for any given craft configuration. The aileron signal outputs 207 are derived from sliders 435 and 436 of potential dividers 433 and 434 and appear between conductors 493 and 494 and ground connection 437, while the rudder signal outputs 210 are derived from sliders 427 and 430 of potential dividers 425 and 426 and appear between conductors 495 and 496 and ground connection 437.

The operation of localizer channel 24 as just described is the same as the operation of glide path channel 25 except for the functioning of D.C. restorer 200 and limiter 201, which have been separately discussed. Alternating voltages are induced in the secondary winding 421 of coupling transformer 429 which vary in amplitude and reverse in phase with variation of the magnitude and reversal in the phase of the signal applied at input terminals 364 and 365, and since the operation of channel 25 has been given in great detail this description will not be repeated. However, in addition to the components just described, the localizer circuit of coupler 23 includes further components which are connected to form a part of the circuit in certain positions of switch 86. These components include resistors 438, 440, 441 and 442 and banks 214 and 215 of switch 86 comprising the rate variation circuit 196, capacitor 443 and bank 217 of switch 86 comprising low pass filter circuit 202, and capacitor 444, resistor 445, and bank 216 of switch 86 comprising turn initiating circuit 212.

In the A, B and E positions of selector switch 86, resistor 370 only is in parallel with capacitor 367 and resistor 371 only is in series with the parallel circuit thus formed. The amount of opposition offered by this circuit to changes in the applied voltage is minimum.

In the D position of switch 86, resistors 370 and 440 in series are in parallel with capacitor 367 and resistors 371 and 442 are in series with the parallel circuit thus formed. The amount of opposition offered by this circuit to change in the applied voltage is greater than that in the A, B, or E positions of the switch.

In the C position of switch 86, resistors 370, 440 and 438 in series are all in parallel with condenser 367, and resistors 371, 442 and 441 are in series with the parallel circuit thus formed. The amount of opposition offered by this circuit to change in the applied voltage is maximum.

In the A, D, and E positions of switch 86 resistor 445 and capacitor 444 in series are short circuited. In the B position of switch 86 capacitor 444 is charged from battery 112, through resistor 445, to a voltage determined by the voltage drop in resistor 354: in one embodiment of the invention this was slightly more than 2 volts. In the C position of switch 86 the charged capacitor 444 and resistor 445 are connected between terminal 450, common to the parallel circuit including condenser 367 and the series circuit including resistor 371, and ground, in such a fashion that the terminal 450 is given a positive voltage. This voltage is greater than any signal normally to be expected at this low level point in the localizer channel, and insures an output from the channel which will cause the turn of the craft to the left no matter what the normal signal is. This charge leaks off capacitor 444 through resistors 441, 442 and 371, after which the capacitor and resistor simply act to slightly increase the opposition offered by the rate circuit to change in the signal voltage.

In the C position only of switch 86 capacitor 443 is connected across output conductors 406 and 407 of ripple filter 202, thus increasing the filtering effect of capacitors 395 and 397 as far as the voltage between the output conductors is concerned.

In one successful embodiment of coupling unit 23, the following values for the various components were used:

| | |
|---|---|
| Resistors 270, 284, 285, 370, 384, 385, 387, 440, 445 | 500,000 ohms. |
| Resistor 271 | 30,000 ohms. |
| Resistors 286, 287, 386, 400, 401 | 250,000 ohms. |
| Resistors 300, 301, 302, 303, 402, 403, 438 | 1,000,000 ohms. |
| Resistor 323 | 300 ohms. |
| Resistor 325 | 200 ohms. |
| Resistor 343 | 50,000 ohms. |
| Resistors 344, 350 | 100,000 ohms. |
| Resistors 345, 355 | 2,000 ohms. |
| Resistor 351 | 21 ohms. |
| Resistor 352 | 40 ohms. |
| Resistor 353 | 60 ohms. |
| Resistor 354 | 10 ohms. |
| Resistors 371, 442 | 10,000 ohms. |
| Resistors 425, 426, 433, 434 | 400 ohms. |
| Resistor 428 | 100 ohms. |
| Resistor 441 | 20,000 ohms. |
| Condenser 267 | 2 microfarads. |
| Condensers 280, 290, 291, 380, 390, 391 | .05 microfarad. |
| Condensers 283, 383 | .01 microfarad. |
| Condensers 295, 296, 297, 298, 340, 341, 342, 395, 396, 397, 398, 444 | 1 microfarad. |
| Condensers 347, 357, 367 | 25 microfarads. |
| Condenser 443 | .25 microfarad. |
| Condensers 322, 422 | .0015 microfarad. |
| Primary windings 95, 137, 160, 315, 331, 415, 467 | 19 volts A.C. |
| Secondary windings 316, 317, 332, 416, 417 | 520 volts A.C. |
| Battery 112 | 28 volts D.C. |
| Inverter 114 output | 19 volts, 105 cycles. |
| Vibrators 183, 194 | 24 volts D.C., 100 c.p.s. natural frequency. |

All diodes sections of 7Y4 tubes.
All triodes sections of 7F7 tubes.

*Operation of the Automatic approach system as a whole*

When it is desired to land at an airport during a period of reduced visibility, the pilot of the craft ordinarily refers to a map of the airport and vicinity to determine the position of the landing strip relative to the main radio range, and the location of the blind landing beam and markers. The remote approach to the airport is made along the main radio range, the attitude of the craft being stabilized by the automatic pilot and being corrected as necessary so that it follows the range at a desired altitude. The receivers 12 and 13 and the coupling unit 23 need not be energized until such an interval before the airport is approached as will allow them to properly heat up and become stable.

The blind landing beam is in known orientation to the main radio range beam, and the approach to any large airport is made under the supervision first of the range operator and then of the control tower operator, as usual: the pilot is advised how to enter the blind landing beam from the range beam, and is cleared for each step of the landing operation by voice transmission. If the blind landing system is set up at a temporary location, the pilot may have to navigate his craft to the vicinity of the landing transmitter by procedure independent of radio ranges. In any case, as the local approach begins receivers 12 and 13 and coupling unit 23 must be in operative condition; switch 86 is left in its "Off" position until the craft intersects the landing beam as directed by the control tower or until the pilot is ready to circle the field to find the beam if temporary equipment makes this necessary. The pilot will know, either by voice instruction or by previous briefing, the preferred altitude, air speed and distance from the transmitter at which to enter the landing beam, although from a technical standpoint, as opposed to a traffic control standpoint, it is possible to enter and make use of the landing beam at any altitude, distance and air speed desired just so long as the entry is at a reasonably acute angle.

In some cases it may be desirable to enter the beam and at once approach the transmitter, but in general it is more desirable to enter the beam, proceed away from the transmitter for a period to lose altitude, then execute a procedure turn and return down the beam to land. The latter method will be explained in detail, since it includes every feature involved in the more simple approach: the course is illustrated by the line 499 in FIGURE 11.

The original entrance of craft to the beam is usually at an altitude well above the glide path, so that horizontal pointer 77 is against its lower stop, and this condition continues during most of the approach. As the craft approaches the beam, the vertical pointer 70 moves away from its central position until it engages one of its stops, depending upon the direction of approach to the beam: if the craft is approaching the beam on the right of transmitter T from below as seen in FIGURE 11, the needle is against its right hand stop, indicating need for a craft approaching the transmitter to be displaced to the right.

As the craft crosses the line TC and traverses the beam the needle 70 moves away from its stop, and the pilot now must move knob 211 from "Off" to "Outbound" so that switch 86 is advanced from the A contacting position to the B contacting position. This movement of switch 86 has no effect in either the rate variation banks 214 and 215, the low pass filter bank 217, the elevator signal bank 224, or the erection cutout bank 225.

The rudder bridge circuit of the automatic pilot is interrupted at bank 220 and there is inserted, between slider 100 of the bridge and ground, the voltage between slider 427 of coupling unit potential divider 425 and ground: this is the larger of the two available rudder signals. The aileron bridge circuit of the automatic pilot is interrupted at bank 221 and there is inserted between slider 133 of the bridge and ground the voltage between slider 435 of potential divider 433 and ground: this is the larger of the two available aileron signals. The relative magnitude of the rudder and aileron voltages is set by adjustment of sliders 427 and 435 so that for any output voltage from transformer 209 the rudder and ailerons are so adjusted as to give a coordinated turn of the craft at its cruising air speed. It will be observed that by the action of banks 220 and 221 the turn control potential divider 463 is rendered ineffective to influence the azimuth control of the craft.

Banks 222 and 223 of switch 86 cooperate to energize transformers 314 and 413 with alternating voltage from inverter 114, in such a phase that the output to the rudder and aileron bridges of the automatic pilot acts to change the heading of the craft to the left.

It is to be particularly noted that the sense of the control exercised by rudder servo 21 when switch 83 is in the "Outbound" position is opposite to that called for by the indication of cross-pointer indicator 14, although causing motion of the craft which returns the needle to center. The indicator is arranged to show the direction of the desired path from a craft approaching the transmitters, and therefore during flight away from the transmitter the indicator shows need for control opposite to that actually required. Phase reverser 88 functions to cause the output of the modulator to be effective in the automatic pilot bridges in a sense opposite to that for which need is indicated by indicator 14, so that a craft flying away from the transmitter may also be guided along the beam by the instrument landing receiver voltages.

At the point when the craft enters the beam the signal to indicator 14 has a selected magnitude: for illustration let it be assumed that terminal 44 in FIGURE 4 is positive. Since the movement if the craft has a component toward the center line, the signal is decreasing or has a negative rate of change. The signal applied to the coupling unit is therefore opposed in the rate inserting network by a voltage proportional to the rate of change of the signal, and the effect on the automatic pilot, tending to cause change in the heading of the craft toward the center of the beam, is less than it would otherwise be. As the angle of movement of the craft becomes greater the rate of change of the signal becomes greater for any given air speed, and hence the modification of the original signal in the rate insertion network becomes greater, and may exceed the simple displacement signal, thus causing the craft to turn away from the beam. Thus the rate at which the craft is approaching the beam is continually reduced.

This effect continues even after the line TA is crossed, and hence the displacement signal as well as that due to the rate of change of heading both are in a direction to cause the craft to return to the line TA. However, at the instant when the craft has changed heading so that it is moving parallel to the line 7A, the rate of change of the signal is zero, and thereafter the signal and its rate of change are again in opposition. Hunting of the craft about the line TA is thus reduced.

Meanwhile bank 216 of switch 86 has completed the circuit by which condenser 444 in the turn initiating circuit has become charged, and bank 226 of the switch has permanently energized the directional arm lock solenoid so that operation of switch 117 is not required to perform this function; azimuth stabilization of the craft is no longer accomplished by the directional gyroscope and the craft is controlled in azimuth only by the localizer of the blind landing unit.

When the craft has proceeded a sufficient distance away from the landing strip, the pilot turns knob 211 to its "Turn" position, advancing the banks of switch 86 to the C position. Bank 216 connects condenser 444, which was previously charged, in the rate insertion circuit so as to supply a relatively large signal simulating voltage of a polarity chosen to cause the craft to turn sharply to the left. Banks 214 and 215 adjust the rate insertion circuit to offer maximum opposition to change in the signal voltage and also to provide maximum resistance in the discharge path of the capacitor. The rudder bank 220, aileron bank 221 and directional arm lock bank 226 of switch 86 function as described in connection with position B of the switch, but bank 225 energizes the erection cutout solenoid independently of its usual control so that the vertical reference will not be lost during the turn due to the effect of acceleration forces. Low pass filter bank 217 connects condenser 443 across the output of ripple filter 202 to smooth the response of the system to decay of the charge on condenser 444 once its effect is felt.

The condenser voltage, application of which to the rate circuit initiates turn of the craft to the left, leaks off to ground through resistor 445, through resistors 441, 442 and 371 and vibrator arm 375, and through resistors 370, 440 and 447 and indicator 14, but in the meantime the craft has turned sharply from the axis of the beam so that a signal is being supplied by the localizer receiver to the coupling unit. Since the craft has turned to the left, the normal effect of this signal would be to turn the craft to the right, heading it back toward the axis again, but this is prevented by banks 222 and 223 of switch 86, which in their C position reverse the phase of the alternating voltage supplying the plates of the modulator tubes in the coupling unit as compared to that supplying the bridges of the automatic pilot. This of course reverses the output from transformers 329 and 429 and therefore completes the turn of the craft in the direction previously initiated, so that its course diverges sharply from the axis, follows a generally circular course of nearly 180°, and then, under the influence of the rate circuit, approaches, oscillates about, and finally settles down on the axis of the beam, headed toward the transmitters.

As the turn is completed the pilot moves knob 211 to its "Inbound" position. In this position banks 214 and 215 operate to provide necessary intermediate resistance in parallel and in series with condenser 367 in the rate insertion circuit, thus somewhat decreasing the opposition offered by the circuit to change in the input signal although still maintaining it above normal. This is desirable if the craft is to be brought on course with a minimum of hunting. Bank 216 removes and grounds the turn initiating circuit, and bank 217 removes the special filtering condenser, each having served its purpose. Banks 220, 221 and 224 bring about no change in the rudder, aileron and elevator signal circuits, and bank 226 still maintains the directional arm lock energized. Bank 225 deenergizes the erection cutout solenoid thus restoring control of the vertical gyroscope to its erecting device, while the phase of alternating voltage supplied to the transformers of the coupling unit is maintained unchanged by banks 222 and 223.

The craft is now flying along the beam toward the transmitter. By a previous briefing or from the map the pilot knows at what distance, altitude and air speed it is most desirable to commence the approach glide, although the air speed is not critical, except in its relation to the landing speed of the craft and the length of the available runway, and distance and altitude are related. If he has not already done so under instructions from the tower or according to his briefing, the pilot now causes the craft to lose altitude while still following the localizer beam, until he comes within the area of the glide path transmitter, generally from the under side, as indicated by needle 77, which then moves downward from its upper stop. He then moves knob 211 to its "Glide" position, advancing switch 86 so its banks are in their E position. In this position banks 214 and 215 restore the rate circuit to its initial condition, thus increasing the sensitivity of the instrument to displacement signals. Turn initiator bank 216, delay bank 217 and erection cutout bank 225 do not function in the E position, and banks 222 and 223 cause no change in the phase of the A.C. for the modulator tubes. Banks 220 and 221 reduce the amount of rudder and aileron output signal for a given input signal in order to reduce danger to the craft from response to transient changes in the beam as the craft approaches the ground. The elevator bridge of the automatic pilot is interrupted at bank 224 and there is inserted between slider 154 and ground the voltage between the slider 326 of coupling unit potential divider 325 and ground. As in the case of the aileron and rudder circuits this voltage is so phased as to cause movement of servomotor 20 in the proper direction to balance out the signal voltage and also to return the craft to the desired landing path, which may now be followed automatically until the craft touches ground.

The system described above is capable of another function, that of guiding a craft past an instrument landing transmitter. For example, suppose a craft enters the localizer beam somewhere to the right of transmitter T in FIGURE 11: then with switch 83 set in its "Inbound" position the craft follows the line A'T until it passes over T. Here a temporary discontinuity of proper receiver output is encountered but once this point is passed the signal becomes usable again, and the craft then follows the line TA until out of range of the transmitter. This procedure would not ordinarily be followed but is available if exceptional conditions make its use desirable.

It should also be pointed out that substitution of a receiver supplying signals from the radio range stations located along the various airways for the localizer receiver would make it possible to fly along the center of the range just as it is possible to fly along the center of the localizer beam.

*Functions of a modified embodiment of the coupling unit*

Figure 8:
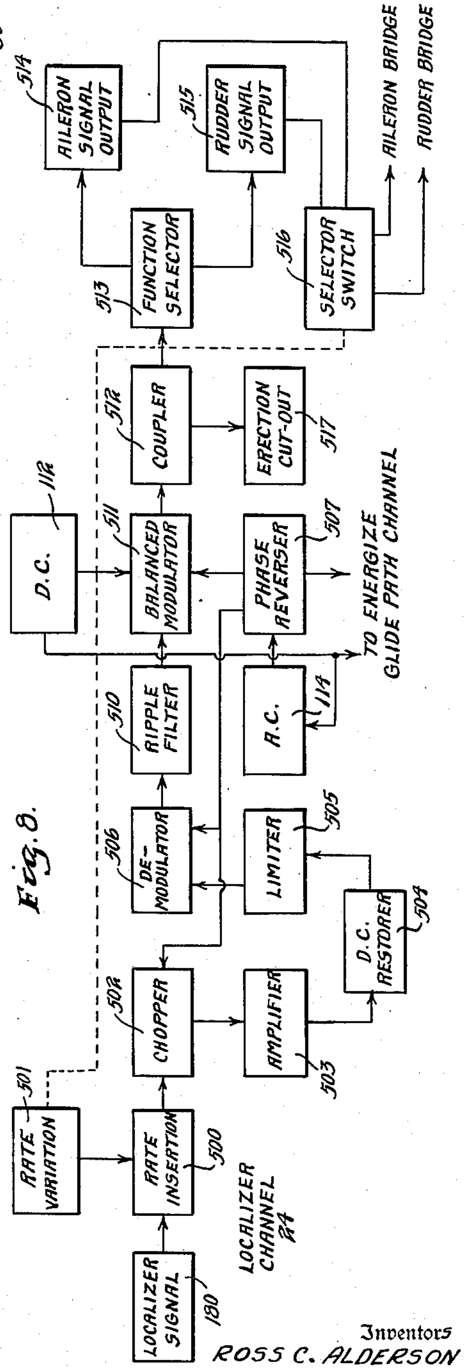
FIGURE 8 is a block diagram generally similar to FIGURE 5, and disclosing the localizer or azimuth channel only of a modification of the invention.

A modified form of the invention in combination with the automatic pilot is shown in detail in FIGURES 9 10 and the modified coupling unit is shown schematically in FIGURE 8. The glide path channel of the coupler and the elevator portion of the automatic pilot are omitted to simplify the showing of this modification, since it will be apparent to those skilled in the art that a similar circuit, or one like that in the first embodiment of this unit, can be used to provide the necessary glide path channel and elevator control. This coupling unit is supplied with localizer signal 180, and is energized from inverter 114 and battery 112, as before.

The coupling unit is shown in FIGURE 8 to comprise a rate insertion circuit 500 and a rate varying means 501: the combined rate and displacement signal is interrupted by a chopper 502. The interrupted signal is amplified in an amplifier 503 and passes through a D.C. restorer 504 and a limiter 505 to a demodulator 506. Demodulator 506 and chopper 502 are energized in the same phase from inverter 114 through a phase reverser 507. The output from demodulator 506 is fed through a ripple filter 510 to the grids of a balanced modulator 511, also energized from inverter 114 through phase reverser 507, and the output from the modulator acts through a coupler 512 to energize a function selector 513 which gives aileron and rudder signal outputs 514 and 515: these outputs are fed through a selector switch 516 to the aileron and rudder bridges of the automatic pilot. Coupler 512 also energizes an erection cutout system 517, and selector switch 516 is also effective on the rate varying means 501.

The automatic pilot as shown below and to the right of the dot and dash line in FIGURE 10 is generally the same as the aileron and rudder portion of the automatic pilot shown in FIGURE 7, and the same reference numerals have been used to identify the same units in the two figures. Rudder bridge 102 is shown as controlling rudder servo 21 and aileron bridge 126 is shown as controlling aileron servo 22, and directional gyroscope 15, vertical gyroscope 16, and turn control 471 cooperate just as before with the two bridges, and are similarly related to the directional arm lock solenoid 122 and the erection cutout solenoid 170.

*Structure and operation of the modified coupling unit selector switch*

Inasmuch as selector switch 516 is effective in all portions of the coupling unit, the details of the switch will first be given, reference now being made to FIGURE 10. The switch will be seen to comprise a shaft 520 mounted for rotation directly by a manual knob 211 movable with respect to a fixed scale 209'. Mounted on and insulated from shaft 520 are a plurality of switching arms or contactors 521, 522, 523, 524, 525 and 526. Associated with each contactor is a bank of four fixed contacts.

It is of course understood that for a complete coupling unit further switching components are required to complete the normal elevator circuit of the automatic pilot in the positions of the switch other than "Glide," and to apply the output of the glide path channel of the coupling unit to the elevator circuit of the automatic pilot in the "Glide" position only of the switch, all as shown in connection with FIGURE 1.

Banks 521 and 522 of switch 516 cooperate to act as phase reverser 507. In the A position of switch 516, no alternating voltage from conductors 118 and 119 appears across output conductors 262 and 263 of the phase reverser. In the B position voltage of a first phase appears at the output conductors, and in the C and D positions voltage of the opposite phase appears there, for purposes presently to be given in detail.

Bank 523 of switch 516 functions in position A to maintain normal operation of aileron function of the automatic pilot, by connecting conductors 141 and 142 together, and in positions B, C, and D to supply the aileron bridge with voltage from function selector 513.

Bank 524 of switch 516 functions in position A to maintain normal operation of the rudder portion of the automatic pilot, by connecting conductors 110 and 111 together, and in positions B, C, and D to supply the rudder bridge with voltage from function selector 513.

Bank 525 of switch 516 functions to insure that the directional arm 86 is locked, in all positions of the switch except position A, in which the directional arm is under the control of turn control knob 471 only.

Bank 526 of switch 516 is inoperative in its A, B, and C position: in its D position it has for its purpose the control of the amount of opposition to change in the signal voltage which is offered by the rate insertion circuit.

The circuits by which the various banks are effective in the coupling unit will be described after the unit itself is given consideration, reference being made to FIGURES 9 and 10.

*The modified coupling unit localizer channel*

The localizer input signal 180 is applied to input terminal 364 and 365 of the localizer channel 24 of the modified coupling unit: input terminal 364 is connected to ground through a ground bus 531. The rate insertion circuit 500 of the localizer channel comprises capacitors 532, 533 and 534 and resistors 535, 536 and 537. Of these elements, capacitors 533 and 534 are switched into and out of the input circuit by blades 540 and 541 of a relay 542 having a further blade 543, a winding 544 actuating an armature 548 to operate the blades, fixed contacts 545 and 546 cooperating with the blades 540 and 541 respectively and fixed contacts 547 and 550 cooperating with blade 543. The relay is shown in its normal or deenergized condition: when winding 544 is energized armature 548 is raised, disengaging blades 540, 541 and 543 from contacts 545, 546 and 550 and moving blade 543 to engage contact 547. The opposition offered by the rate insertion circuit to change in the input signal is greater in the normal condition of the relay and less in its operated condition.

The output of the rate insertion circuit 500 is applied across the interrupting contacts of chopper 502 which comprises a winding 561, a moving contact 562, and a fixed contact 563 which is not engaged by contact 562 when the vibrator is not energized. Winding 561 is energized with alternating current from conductors 262 and 263 through conductors 565 and 566, a phasing capacitor 564 and a dropping resistor 551, and the blade 562 vibrates in synchronism with the alternations of the current flowing in its winding, engaging first one of the fixed contacts and then the other. Details of the structure of one vibrator suitable for use as chopper 502 are to be found in the copending application of Frederick W. Side, Serial No. 421,176, filed December 1, 1941, now abandoned.

The chopper circuit is connected by means of a coupling capacitor 567 and ground bus 531 to amplifier 503, which comprises a pair of triodes 570 and 571 connected in cascade by an interstage coupling capacitor 572. A transient suppression capacitor 573 is connected into the circuit in a slightly different fashion from the similar capacitor 383 in FIGURE 6, but performs the same function. The triodes are provided with grid resistors 574 and 575 and plate resistors 576 and 577: and plate potential is shown as being provided by a suitable D.C. source 580, the negative terminal of which is grounded as at 581. The output of amplifier 503 is applied in parallel across a pair of resistors 585 and 586, through grounded bus 531 and through coupling capacitor 584, conductor 589, resistor 588, conductor 569, and coupling capacitors 587 and 590: resistors 585 and 586 have a common terminal 91 which is connected to ground.

D.C. restorer 504 and limiter 505 are connected in sequence between amplifier 503 and resistors 585 and 586. The restorer comprises a triode 582 having a cathode 617 connected to conductor 589 and a grid and plate connected together to form an anode 621, which is connected to ground bus 531: the tube functions as a diode. Limiter 505 comprises a triode 583 having a cathode 620 connected to a conductor 619, and a grid and plate connected together to form an anode 622 which is connected to conductor 569.

Demodulator 506 is shown to comprise a pair of triodes 598 and 599 in a common envelope, and having cathodes 611 and 612, grids 613 and 614, and plates 615 and 616, all respectively. The cathode circuits of these triodes include a pair of resistors 594 and 595 and a first pair of capacitors 596 and 597. These four components have a common conductor 602: the other terminals of capacitor 596 and resistor 594 are connected by a conductor 603 to the cathode 611 of triode 598, and the other terminals of capacitor 597 and resistor 595 are connected by a conductor 604 to the cathode 612 of triode 599. The grids of demodulator 506 are connected to the ungrounded ends of resistors 585 and 586 by conductors 592 and 593. Common conductor 602 is connected to the wiper 605 of a potential divider 606 having a winding 608 one end of which is grounded and the other end of which is connected to the positive terminal of battery 112 through conductor 649, a dropping resistor 607 and conductor 610. By this means a variable positive bias with respect to ground may be maintained on the cathodes of triodes 598 and 599. Conductor 603 is connected to balanced modulator 511 through resistor 619 and conductor 618, and conductor 604 is connected to modulator 511 through resistor 628 and conductor 639. Conductors 618 and 639 are connected to conductor 602 by capacitors 600 and 601: resistors 594, 595, 619 and 628 and capacitors 596, 597, 600 and 601 and their interconnections comprise ripple filter 510.

Plates 615 and 616 of triodes 598 and 599 are energized with alternating voltages of opposite phase with respect to ground by conductors 623 and 624 from a secondary winding 625 of a transformer 626: winding 625 is center tapped as at 627 and the center tap is grounded as at 630. Transformer 626 is provided with a primary winding 631 energized by conductors 262 and 263 from phase reverser 507, and has four further secondary windings 632, 633, 634, and 629 for purposes presently to be set forth.

The output from ripple filter 510 is impressed by conductors 618 and 639 upon the grids 635, 636, 637 and 640 of modulator 511 which is made up of four triodes 641, 642, 643 and 644 shown in two envelopes. These triodes include respectively cathodes 645, 646, 647 and 650 and plates 651, 652, 653 and 654. The four cathodes are connected through a common conductor 655 and a bias resistor 656 to ground bus 531. Resistor 656 is shunted by a by-pass capacitor 658.

Plates 651 and 652 are energized by alternating voltages, of opposite phase with respect to a point above ground potential, by means including secondary windings 632 and 634 of transformer 626, and in like fashion plates 653 and 654 are energized with alternating voltages of opposite phase with respect to the same point by means including secondary windings 633 and 629 of transformer 626. The means here referred to also includes battery 112 and the primary winding 657 of a transformer 660 having a secondary winding 661, the primary winding being center tapped as at 662, and shunted by a capacitor 659 to adjust the phase of the output voltage.

Transformer 660 comprises coupler 512 of FIGURE 8, and the output from secondary winding 661 of this transformer is applied across the windings 663 and 664 of a pair of potential dividers 665 and 666, which together comprise function selector 513 and which are provided with sliders 667 and 670, by conductors 671 and 672, the latter being grounded at 673. Sliders 667 and 670 are connected to contacts B, C, and D of banks 523 and 524 by conductors 674 and 675 respectively, to control the aileron and rudder functions of the automatic pilot.

The output of transformer 660 is also connected to control the erection mechanism of the vertical gyroscope through erection cutout means 517, which is shown to comprise a pair of tetrodes 676 and 677 in a single envelope, and a relay 680 comprising a solenoid 700 controlling an armature 701 which actuates a movable contact 702 with respect to a fixed contact 703. The tetrodes comprise respectively cathodes 681 and 682, control grids 683 and 684, screen grids 685 and 686, and anodes 687 and 690. For these tetrodes there are provided grid resistors 691 and 692, and a bias potential divider 693 comprising a slider 694 and a winding 695, one end of which is grounded at 673 through a conductor 689, and the other end of which connects to the positive bus 610 through a dropping resistor 730. The tetrodes are connected to comprise a two stage resistance-capacitance coupled amplifier by a coupling capacitor 696 and anode potential is supplied for the tetrodes from the positive bus through plate resistor 697 for the first stage and through winding 700 of relay 680 for the second stage. A capacitor 704 is connected across winding 700 to absorb inductive current surges. Energization of relay 680 is effective to complete a circuit from the positive bus 610 to the erection cutout solenoid 170 independent of switch 172. A pilot light 705 is provided to indicate when the erection cutout means is in operation.

Contactor arm 525 is connected to the positive bus 610 by a conductor 734, and contactor 526 is grounded as at 707. The D contact only of bank 526 is connected by a conductor 710 to one terminal of winding 544 of rate varying relay 542: the other end of winding 544 is connected to positive bus 610 through resistor 711. Fixed contacts 547 and 550 of relay 542 are connected to the sliders 712 and 713 of a pair of potential dividers 714 and 715 whose windings 716 and 717 are connected in parallel: one end of this parallel circuit is grounded at 720 and the other end is connected to the positive bus 610 by conductor 721. Movable contact 543 of relay 542 is connected by conductor 619 to cathode 620 of limiter 583.

*Circuit details of the modified coupling unit*

For the sake of completeness, certain specific circuits in FIGURES 9 and 10 will now be traced. D.C. restorer 504 simply acts as a non-linear impedance connected between conductor 589 and ground bus 531: its anode voltage is the output voltage from amplifier 503. Limiter 505 is similarly a non-linear impedance connected between conductor 569 and ground bus 531, but this tube is provided with means giving the impedance an adjustable bias. The operating voltage for the limiter is the output signal from the amplifier less the bias voltage, and the plate circuit for the limiter may be traced from conductor 569 through anode 622, cathode 620, conductor 619, movable contact 543, one of fixed contacts 547 and 550, one of sliders 712 and 713, a portion of one of windings 716 and 717, and ground connection 720 to ground bus 531.

The anode circuit of triode 598 may be traced from plate 615 through cathode 611, the parallel combination of resistor 594 and capacitor 596, conductor 602, slider 605, the lower portion of winding 608, ground bus 531, ground connection 630, center tap 627, the lower half of winding 625, and conductor 624 to plate 615.

The anode circuit of triode 599 may be traced from plate 616 through cathode 612, the parallel combination of resistor 595 and capacitor 597, conductor 602, slider 605, the lower portion of winding 608, ground bus 531, ground connection 630, center tap 627, the upper half of winding 625, and conductor 623 to plate 616.

Triodes 598 and 599 are selected for electrical equivalence, so that for equal anode voltages and equal grid voltages of the same polarity, equal anode currents flow through equal loads on the tubes. As used in demodulator 506, however, the tubes are biased, by voltage determined by the setting of slider 605, to a point where discharge of the tubes, with the normal alternating anode voltage from secondary winding 625 on anodes 615 and 616 and with zero signal voltage, is just cut off.

The anodes 615 and 616 are energized in opposite phase, while the grids are energized in the same phase, which is determined by phasing condenser 564 to be either that of one anode or that of the other. When the grid and anode of triode 598 for example are in phase, the tube discharges, and the cathode current through resistor 594 creates a voltage across it which is impressed on the grids of the balanced modulator through the ripple filter. Anode 599 does not discharge under these conditions, because its anode is negative when its grid is positive and vice versa. However, if the phase of the voltage on grids 613 and 614 is reversed, it is now in phase with that in anode 616, and triode 599 now discharges, producing a voltage drop across resistor 595 which is also conducted to the balanced modulator grids through the ripple filter.

Since neither triode 598 nor triode 599 can discharge when its anode is negative, each acts as a grid controlled half wave rectifier, and the result of discharge of either triode is a pulsating unidirectional voltage between conductors 603 and 604 of which the polarity depends on which triode is discharging. By the action of ripple filter 510 the alternating components of this voltage are removed and a substantially pure unidirectional voltage of reversible polarity and variable amplitude appears between conductors 618 and 639.

The anode circuit of triode 641 may be traced from plate 651 through cathode 645, conductor 655, the parallel combination of bias resistor 656 and capacitor 658, ground bus 531, ground connection 124, battery 112, positive bus 610, conductor 609, center tap 662, the upper half of winding 657, conductor 722, winding 632 and conductor 723 to plate 651.

The anode current of triode 642 may be traced from plate 652 through cathode 646, conductor 655, the parallel combination of bias resistor 656 and capacitor 658, ground bus 531, ground connection 124, battery 112, positive bus 610, conductor 609, center tap 662, the lower half of winding 657, conductor 725, winding 634, and conductor 724 to plate 652.

The anode circuit of triode 643 may be traced from plate 653 through cathode 647, conductor 655, the parallel combination of bias resistor 656 and capacitor 658, ground bus 531, ground connection 124, battery 112, positive bus 610, conductor 609, center tap 662, the lower half of winding 657, conductor 725, winding 633, and conductor 726 to plate 653.

The anode circuit of triode 644 may be traced from plate 654 through cathode 650, conductor 655, the parallel combination of bias resistor 656 and capacitor 658, ground bus 531, ground connection 124, battery 112, positive bus 610, conductor 609, center tap 662, the upper half of winding 657, conductor 722, winding 629, and conductor 727 to plate 654.

It will be observed that, when a unidirectional voltage appears between conductors 603 and 604, grids 635 and 636 are of the opposite polarity to grids 637 and 640, and the plates 651 and 653 are 180° out of phase with plates 652 and 654 by reason of their connection to the windings of transformer 626. This arrangement is equivalent to that described in connection with triodes 310, 311, 312 and 313, and transformers 314, and 329 in FIGURE 6, and the operation of this structure will not be repeated.

The output circuit of transformer 660 may be traced from the upper terminal of secondary winding 661 through conductor 671, the windings 663 and 664 of potential dividers 665 and 666, resistor 730 and conductor 672 to the lower terminal of secondary winding 661. Slider 670 accordingly acts as one terminal of a circuit which may be traced through conductor 675, contact B, C, or D of bank 524, contactor 524, conductor 111, rudder bridge 102, conductor 108, amplifier 105, and ground connection 106 to ground connection 673. Slider 667 acts as one terminal of a circuit that may be traced through conductor 674, contact B, C, or D or bank 523, contactor 523, conductor 142, aileron bridge 126, conductor 144, amplifier 140, and ground connection 143 to ground connection 673.

The anode circuit of tetrode 676 may be traced from the positive pole of battery 112 through positive bus 610, resistor 697, anode 687, cathode 681, conductor 699, slider 694, the lower portion of winding 695, conductor 689, and ground connections 673 and 124 to the negative pole of the battery.

The anode circuit of tetrode 677 may be traced from the positive pole of battery 112 through positive bus 610, the parallel combination of capacitor 704 and winding 700 of relay 680, anode 690, cathode 682, conductor 699, slider 694, the lower portion of winding 695, and ground connections 673 and 124 to the negative pole of the battery.

The bias voltage for tetrode 676 and 677 is supplied from potential divider 693 which is energized through a circuit which may be traced from the positive pole of battery 112 through positive bus 610, dropping resistor 730, winding 695, conductor 689 and ground connections 673 and 124 to the negative pole of the battery.

The normal circuit for the erection cutout may be traced from the positive pole of battery 112 through positive bus 610, conductors 115 and 116, switch 172, conductor 731, solenoid 170, and ground connections 174 and 124 to the negative pole of the battery.

The controlled circuit for the erection cutout may be traced from the positive pole of battery 112 through positive bus 610, fixed contact 703, movable contact 702, conductor 732, solenoid 170, and ground connections 174 and 124 to the negative pole of the battery.

The normal circuit for the directional arm lock may be traced from the positive pole of the battery through positive bus 610, conductors 115 and 171, switch 117, conductor 733, solenoid 122, and ground connections 123 and 124 to the negative pole of the battery.

The controlled circuit for the directional arm lock may be traced from the positive pole of the battery through positive bus 610, conductor 734, contactor 525, fixed contact B, C, or D of bank 525, contactor 525, conductor 735, solenoid 122, and ground connections 123 and 124 to the negative pole of the battery.

The operating circuit for relay 542 may be traced from the positive pole of battery 112 through positive bus 610, resistor 711, conductor 735, winding 544, conductor 710, fixed contact D of bank 526, contactor 526, and ground connections 707 and 124 to the negative pole of the battery.

The heaters of the various electron discharge devices are energized in any suitable fashion not specifically shown.

*Operation of the modified system*

A comparison of FIGURES 6 and 7 with FIGURES 9 and 10 will make it apparent that operation of the two coupling units is basically the same. In the former the signal after amplifying and shaping is passed through a mechanical rectifier or demodulator mechanically synchronized with the original chopper. In the latter the signal after amplifying and shaping is passed through an electronic rectifier or demodulator electrically synchronized with the original chopper, that is, member 506 in FIGURE 9 takes the place and performs the function of member 198 of FIGURE 6. For when grids 613 and 614 are at ground potential no currents flow in resistors 594 and 595 and conductors 603 and 604 are at the potential of their cathodes with respect to ground, while when grids 613 and 614 are not at ground potential unequal currents flow in resistors 594 and 595 and a potential difference appears between conductors 603 and 604 which is of a substantially constant magnitude—because of the effect of ripple filter 510—determined by the voltage between conductors 592 and 593.

During the remote approach switch 516 is left in its A position: the ailerons are controlled primarily by the vertical gyroscope and the rudder by the directional gyroscope, both being subject to control by turn control knob 471 as previously described, the directional arm lock and the erection cutout being simultaneously operated when the knob is turned: in this position of the switch no alternating voltage is delivered to any portion of the coupler. At the appropriate time in the approach knob 211 is turned to advance switch 516 to its B or "Outbound" position. Plates 615, 616, 651, 652, 653,

654 are now supplied with alternating voltage of a first phase from inverter 114 through banks 521 and 522.

If the craft is on the proper path no voltage is applied ot terminals 364 and 365, for operation of chopper 502 to convert to alternating voltage; amplifier 503 gives no output voltage, members 504 and 505 are ineffective, grids 613 and 614 are at ground potential, no currents flow in resistors 594 and 595, grids 635, 636, 637 and 640 are at the same potential, equal currents flow upward and downward from center tap 662 of the primary winding of transformer 660, no current flows in potential divider windings 663 and 664, contactors 523 and 534 are at ground potential, no voltage appears on amplifiers 140 and 105, and servomotors 22 and 21 remain at rest. Directional arm lock has been operated by bank 525 and will remain so for the rest of the approach. The erection cutout has not been operated because no voltage is impressed on the control grid of tetrode 676. Operation of turn control knob from this time on can do no more than operate the erection cutout.

Suppose now that a signal is being supplied to the coupling unit from the localizer receiver such that terminal 365 is positive with respect to terminal 364. Then whenever blade 562 of chopper 502 is out of engagement with fixed contact 563, the grid of triode 570 is made positive with respect to its cathode, and whenever movable blade 562 is in contact with fixed contact 563 of chopper 502 the grid of triode 570 is at cathode potential: accordingly a square wave is transmitted throughout amplifier 503. Since the amplifier has an even number of stages, the voltage impressed on the grids of demodulator 506 is positive whenever the grid of triode 570 is positive. At this time one of plates 615 and 616 is positive with respect to ground and the other is negative, since the vibrator is phased to synchronism with the voltage on the plates of the demodulator tubes by proper selection of capacitor 564: for the sake of discussion it will be assumed that the circuit is so arranged that plate 615 is positive at the same time that blade 562 engages contact 563. During this half cycle of the alternating voltage discharge accordingly takes place in triode 598, and a positive pulse of voltage appears across resistor 594. During the next half cycle plate 616 is positive, but movable blade 562 has engaged fixed contact 563, grounding the grid of triode 570, so no voltage is transmitted through the amplifier to the grid of triode 599. Accordingly the same discharge of this triode takes place as does when no signal is applied to the input of the coupler: this is normally adjusted to zero by movement of slider 605. As a result of this action of triodes 598 and 599, conductor 603 becomes positive with respect to conductor 604, and the effect of ripple filter 510 is to smooth out any pulsation to give a substantially uniform unidirectional voltage which makes grids 635 and 636 of triodes 641 and 642 more positive with respect to their cathodes than are grids 637 and 640 of triodes 643 and 644.

Plates 651, 652, 653 and 654 are supplied with electrical energy from the same transformer 626 which supplies plates 615 and 616 of demodulator 506. For the sake of discussion let it be assumed that the transformer and the tubes are so connected that plates 651 and 653 are positive at the same time that plate 615 is positive and that plates 652 and 654 are positive at the same time that plate 616 is positive. With this grid and plate voltage relationship, during the first half cycle, in which contactor 562 is not engaging fixed contact 563, plates 651 and 653 are positive so that a discharge can take place in triodes 641 and 643. As pointed out in the preceding paragraph, conductor 603 is at a higher positive potential than conductor 604, and therefore a greater discharge takes place in triode 641 than in triode 643. The discharge of triode 641 is accompanied by current flowing upward in primary winding 657, while the discharge of triode 643 is accompanied by a downward flow of current in the primary winding: the former, upward current is the larger. During the next half cycle plates 652 and 654 are positive and triodes 642 and 644 are therefore able to discharge. Grid 636 is more positive than grid 640 as previously pointed out, and the discharge in triode 642 therefore is greater than the discharge in triode 644. This results in a greater current flowing downward in primary winding 659 than the current flowing upward, so that in successive half cycles of the alternating voltage the preponderant current first flows upward and then downward in primary winding 659, inducing in the secondary winding 661 an alternating voltage of the frequency of the source. This alternating voltage is impressed across the windings of potential dividers 665 and 666, and portions having ratios suitable to cause a coordinated turn of the craft are taken off by the sliders of these potential dividers and are inserted in series in the amplifier inputs, thus bringing about operation of the servomotors as has been previously explained. The arrangement is such that for an input signal of the polarity first described, the output voltage from transformer 660 is of such a phase as to be balanced out by displacement of the bridge potential divider sliders 135 and 100 in a first direction, which is accompanied by turn of the craft in the first direction.

If the signal supplied to terminals 364 and 365 is of the opposite polarity, that is if terminal 365 is negative with respect to terminal 364, the grid of triode 570 is made negative rather than positive with respect to the cathode, and a square wave of essentially the opposite phase of that first described is transmitted through amplifier 503. Grids 613 and 614 of demodulator 506 are positive a half cycle later than in the previous case, conductor 604 is more positive than conductor 603 and by an action in every way analogous to that described for the previous signal the output from transformer 660 is of the opposite phase. When a signal of this phase is delivered to the bridge circuits, the rudder and aileron servomotors are operated in the opposite direction, and turn of the craft in opposite sense takes place.

At any time that a voltage is impressed across the windings of potential dividers 663 and 664, the same voltage is being applied to the control grid 683 of tetrode 676, in which it is amplified, coupled to tetrode 677 and again amplified. The anode current of tetrode 677 traverses winding 700 of erection cutout relay 680, and the bias on the tetrode is adjusted by slider 695 so that the change in average anode current in tetrode 677 due to the appearance of a voltage upon grid 683, regardless of its phase, is sufficient to cause actuation of armature 701 so as to operate the movable contact 702 and energize the erection cutout solenoid 170.

Switch 516 is used in the same fashion as was switch 86 in making a landing, except that automatic reversal of the direction of flight of the craft along the beam using a "Turn" position of the switch is not provided: this switch has only "Off," "Outbound," "Inbound," and "Glide" positions, and other flight evolutions must be manually controlled.

The "Glide" position (D) of bank 526 of switch 516 causes energization of relay 542 from battery 112. Operation of relay 542 removes capacitors 533 and 534 from the rate insertion circuit, thus giving a reduced opposition to change in the warning signal. Operation of relay 542 also substitutes a voltage preselected by adjustment of slide 712 for a voltage preselected by adjustment of slider 713 as bias for limiter 505, to change the maximum signal available at the grids of demodulator 506 and hence to alter the maximum output which can be obtained from the coupling unit. Ordinarily this change is in a direction to reduce the available, since overcontrol near the ground can lead to dangerous conditions.

In one successful embodiment of this modified system the following values for the various components were found satisfactory.

| | |
|---|---|
| Resistor **92** | 288 ohms. |
| Resistors **96**, **134** | 1,100 ohms. |
| Resistor **131** | 1,288 ohms. |
| Resistor **462** | 1,780 ohms. |
| Resistor **535** | 400,000 ohms. |
| Resistor **536** | 25,000 ohms. |
| Resistor **537** | 50,000 ohms. |
| Resistor **551** | 800 ohms. |
| Resistors **574**, **575**, **691** | 500,000 ohms. |
| Resistors **576**, **577** | 250,000 ohms. |
| Resistors **585**, **586** | 1,000,000 ohms. |
| Resistors **588**, **692** | 100,000 ohms. |
| Resistors **594**, **595** | 5,000 ohms. |
| Resistors **608**, **663**, **664**, **693**, **716**, **717** | 500 ohms. |
| Resistor **656** | 2,000 ohms. |
| Resistor **697** | 30,00 ohms. |
| Resistor **711** | 70 ohms. |
| Resistor **730** | 250 ohms. |
| Condensers **532**, **704** | 25 microfarads. |
| Condensers **533**, **658** | 50 microfarads. |
| Condenser **534** | 2,000 microfarads. |
| Condenser **564** | 12 microfarads. |
| Condensers **567**, **572**, **585**, **590**, **669** | .05 microfarad. |
| Condenser **584** | .5 microfarad. |
| Condensers **596**, **597** | 2 microfarads |
| Condensers **600**, **601** | 1 microfarad. |
| Condensers **659**, **696** | .005 microfarad. |
| Battery **112** | 24 volts. |
| Inverter **114** | 1 phase, 19 volts, 105 cycles. |
| Secondary winding **625** | 520 volts. |
| Secondary windings **93**, **136**, **465** | 30 volts. |
| Secondary windings **629**, **632**, **633**, **634** | 260 volts. |
| Primary windings **95**, **137**, **467**, **631** | 19 volts. |
| Vibrator **502** | 105 cycle synchronous, 19 volts. |

All triodes section of 7F7 tubes.
All tetrodes section of 28D7 tubes.

*Structure of a second modification of the invention*

In the embodiment of the invention shown in FIGURES 6 and 7 the output of each channel of the coupling unit is taken from a balanced modulator and fed to a mixing transformer whose output performs craft control functions. In the localizer channel, moreover, a mixing transformer provides aileron signal outputs and rudder signal outputs, which are applied in the aileron and rudder bridges of the automatic pilot.

A modified form of the invention is shown in FIGURE 12, in which parts identical with those shown in FIGURES 6 and 7 are given the same reference numerals. FIGURE 12 shows both the automatic pilot and the coupling unit, the localizer channel only of the latter being shown, since the application of the inventive principle to the glide path channel will be apparent from previous discussions. The localizer channel of the coupling unit uses a synchronous vibrator without a subsequent rectifier, to feed a half wave motor control discriminator. The output of the system is supplied as a single voltage in the turn control circuit rather than as two voltages in the aileron and rudder bridges, and is obtained from a motor driven voltage divider rather than from a mixing transformer. Moreover, the coupling unit is operated to null rather than relying on rebalance in only the automatic pilot. Means for accomplishing these functions are now to be explained: in view of the general similarity between this modification and those previously described, no block diagram of the functions performed is presented.

In the device of FIGURE 12 a selector switch 800 includes a shaft 801 mounted for reversible rotation in accordance with the setting of a manual knob 802 movable with respect to a fixed scale 803: the driving connection between knob 802 and shaft 801 may be either electrical or mechanical. Mounted on and insulated from shaft 801 are a plurality of switch arms or contactors 804, 805, 806, 807, 810 and 811: other switch arms may also be provided, as required in the elevator channel, and for cutting out the erection of the vertical gyroscope and locking the directional arm, all as previously discussed. Associated with each contactor is a bank of five fixed contacts any one of which may be engaged by the contactor, which accordingly has five operative positions corresponding to the "Navigate," "Outbound," "Off," "Inbound," and "Glide" indications on scale 803.

Banks 807 and 810 cooperate to act as a phase reverser 812 having output conductors 813 and 814. In the "Off" position of selector switch 800 no alternating voltage appears between conductors 813 and 814. In the "Inbound" and "Glide" positions of the selector switch, 105 cycle alternating voltage of a first phase, derived from conductors 118 and 119, appears between conductors 813 and 814. In the "Outbound" position of the selector switch, 105 cycle alternating voltage of a second, opposite phase, derived from conductors 118 and 119, appears between conductors 813 and 814. In the "Navigate" position of the selector switch, 105 cycle alternating voltage, derived from conductors 118 and 119, appears between conductors 813 and 814: the phase of this voltage depends on the position of a reversing switch 815 independent of switch 800. If switch 815 is closed to the right, conductor 813 is connected to conductor 119 through contact arm 807, conductor 816, reversing switch 815, and conductor 817, while conductor 814 is connected to conductor 118 through contact arm 810, conductor 820, reversing switch 815, and conductor 823.

Alternating voltage of a frequency of 400 cycles is supplied between conductor 818 and grounded conductor 819, and is impressed by conductor 822 and ground connection 825 upon the primary winding 827 of a transformer 830 having a plurality of secondary windings 828, 831, 832 and 833, the latter two windings being center tapped at 834 and 835 respectively. Winding 832 energizes the plates of a full wave rectifier 836, and center tap 834 is grounded through conductor 837, resistor 838, and ground connection 840. Resistor 838 is shunted by a by-pass capacitor 839. The cathode of rectifier 836 energizes a filter capacitor 893 whose output energizes a resistance-capacitor filter 841 and a further, graded resistance-capacitance filter 842.

The input terminals of the coupling unit are shown at 365' and 364', and the input circuit includes a rate insertion network 844. Banks 804 and 805 of switch 800 are associated with rate insertion circuit 844, and function to vary the degree to which the displacement signal is modified in proportion to its rate of change. Network 844 comprises capacitor 845, variable resistors 846 and 847 and fixed resistors 850, 851, 852 and 853. Capacitor 845 is in the rate insertion network in all positions of switch 800. In the "Navigate" position of switch 800 the ratio of rate signal to displacement signal is adjusted by resistor 846, and the total signal is adjusted by resistor 847. This arrangement is capable of the greatest variation in ratio of rate signal to displacement signal, and also of the greatest variation in total signal.

In the "Outbound" and "Glide" positions of switch 800, the ratio of rate signal to the displacement signal is determined by resistor 851, and the total signal by resistor 853: here the least modification of the displacement signal takes place.

In the "Inbound" and "Off" positions of switch 800 the amount of displacement signal is determined by resistors 850, 851, and the amount of rate signal by resistors 852 and 853: the amount of modification of the displacement signal is greater here than that just recited, and ordinarily less than that first recited.

The output of rate insertion network 844 appears between switch arm 805 and ground bus 854 and is applied through coupling capacitor 855 to the input of an amplifier 857 comprising a number of resistance coupled stages 860, 861, 862 and 863. There is also provided a vibrator or interrupter switch 864 comprising a winding 865, a movable contact 866, and a pair of fixed contacts 867 and 870. Movable contact 866 is connected to ground bus 854 by conductor 871, and fixed contact 867 is connected to switch arm 805. Vibrator 864 is energized from winding 831 of transformer 830 through conductor 868, phasing capacitor 872, and conductor 873, and through ground connection 874, ground bus 854, and conductor 871. This causes movable contact 866 to move back and forth so that it alternately engages and disengages fixed contact 867: when the contacts are in engagement the input to amplifier 843 is grounded, while when the contacts are disengaged the full output from network 844 is impressed upon the amplifier. The variable unidirectional output voltage from the network is thus converted to a square wave alternating voltage of variable magnitude, and phasing capacitor 872 is selected so that movement of member 866 is exactly in phase with the voltage across primary winding 827.

Stage 860 of amplifier 857 comprises an input resistor 875, a triode 876, a plate resistor 877, and a coupling capacitor 880. Stage 861 of amplifier 857 comprises an input resistor 881, a triode 882, a plate resistor 883, a coupling capacitor 884, a coupling transformer 880' having a primary winding 881' and a secondary winding 882', a filtering capacitor 883' and a blocking capacitor 884'. The plates of triodes 876 and 882 are energized through their respective resistors from graded filter 842 which is of the resistance-capacitance type, and comprises resistors 885 and 886 and capacitors 890 and 891.

Bank 806 of switch 800 is arranged to effect the connection between coupling capacitor 884 and the next stage 862 of the amplifier, by short circuiting secondary winding 882' when switch 800 is in its "Off" position. In the "Navigate," "Outbound," "Inbound," and "Glide" positions of the switch no change in the circuit is brought about.

Stage 862 of amplifier 843 includes a triode 910, a plate resistor 911, and a coupling capacitor 912. The input circuit of stage 862 comprises, in addition to secondary winding 882' of transformer 880' a resistor 895, a portion of the winding 887 of a voltage divider 888 determined by the position of its slider 889, and the output of a bridge 897 energized from winding 828 of transformer 830 through a dropping resistor 899, the series circuit being complete by conductors 903 and 904. Bridge 897 is made up of the windings 896 and 901 of a pair of voltage dividers connected in parallel, and its output terminals are the sliders 900 and 902 of the voltage dividers, the latter terminal being grounded. Winding 887 is energized from the output of a velocity generator 895'. The input to stage 862 is thus the sum of the voltage outputs from transformer 880', velocity generator 895', and bridge 897.

Stage 863 of amplifier 843 comprises an input resistor 913, a triode 914, a plate resistor 915, and a coupling capacitor 916. The plates of triodes 910 and 914 are energized through their respective resistors from filter 841 which is of the resistance-capacitance type and comprises resistor 869 and capacitor 892.

The output of coupling capacitor 916 of the last amplifier stage 863 is supplied to the grids of a pair of triodes 924 and 925 through a conductor 926. The cathodes of these triodes are grounded as at 840, and they are provided with an input resistance comprising resistor 833 and a resistor 927 connected in series therewith. In addition to its function as a part of the input resistance for triodes 924 and 925, resistor 838 also acts as a biasing resistor, varying the bias on the triodes in accordance with the output of rectifier 836, which is in turn determined by the drain through amplifier 857 as a load on the rectifier.

Triodes 924 and 925 comprise portions of a phase sensitive discriminator 930: the plates are energized by conductors 931 and 932 from winding 833 of transformer 830, and the center tap of the winding is connected by a conductor 933 to energize one winding 934 of a motor 935 having a rotor 936 and a second winding 937. Windings 934 and 937 are grounded as at 940. Winding 937 is continuously energized with 400 cycle alternating voltage through a circuit which may be traced from conductor 818 through conductor 822, phasing capacitor 939, and conductor 942, and ground connection 940 to grounded conductor 819. Capacitor 938 is connected in parallel with winding 934 to improve its power factor.

Automatic pilot 18′ is generally the same as automatic pilot 18, but differs in certain particulars. Instead of being directly connected to conductor 107′, slider 464 in the turn control circuit is connected to a center tap 945 on the winding 946 of a voltage divider 947 having a slider 950, and to the contact of bank 811 of switch 800 engaged when the movable contact is in its "Off" position. The movable contact of bank 811 is connected to conductor 952: all the other fixed contacts of bank 811 are connected by conductor 951 to slider 950. Winding 946 is energized through a dropping resistor 949 from the secondary winding 906 of a transformer 905 having a primary winding 907 connected to conductors 118 and 119 through conductors 813 and 814 and banks 807 and 810 of switch 800 acting as phase reverser 812.

In FIGURE 12 there are shown two different sources of alternating voltage, one of 105 cycles, which supplies the automatic pilot 18′, and one of 400 cycles, which supplies the coupling unit. It is a particular advantage of the system here shown that diversity in the nature of the power required by components of the system is no bar to its successful operation.

In the "Navigate," "Outbound," "Inbound," and "Glide" positions of switch 800, bank 811 completes a connection between conductor 107′ and slider 464 which includes conductors 952 and 951, the portion of winding 946 between slider 950 and center tap 945, and conductor 944: in the "Off" position of the switch conductor 107′ is connected to slider 464, as in FIGURE 7, by conductors 952 and 944.

Slider 900 of bridge 897 and slider 950 of voltage divider 947 are mechanically connected by suitable means 953, which may include reduction gearing indicated at 954, to the rotor 936 of motor 935, so that any rotation of the motor causes movement of the sliders with respect to their windings.

The rotor 936 of motor 935 is further coupled in driving relation to velocity generator 895′. This generator is of the type sometimes referred to as a dynamic transformer, which supplies an alternating voltage of fixed frequency at its output which varies in amplitude with the speed at which it is driven, and which reverses in phase with reversal in the direction of the drive. The generator is energized from conductors 818 and 819.

In one successful embodiment of the invention the following values were found satisfactory:

| | |
|---|---|
| Resistor 838 | 25,000 ohms. |
| Resistor 846 | 2,000,000 ohms. |
| Resistor 847 | 50,000 ohms. |
| Resistors 850, 951, 875, 895, 915 | 500,000 ohms. |
| Resistors 852, 853 | 10,000 ohms. |
| Resistors 869, 886 | 30,000 ohms. |
| Resistors 877, 885 | 100,000 ohms. |
| Resistors 881, 911, 913, 927 | 1,000,000 ohms. |
| Resistor 883 | 250,000 ohms. |
| Resistor 887 | 1,000 ohms. |
| Resistors 896, 901 | 2,000 ohms. |
| Resistor 899 | 2,500 ohms. |
| Resistor 946 | 340 ohms. |
| Resistor 949 | 110 ohms. |
| Capacitor 839 | .2 microfarad. |
| Capacitor 845 | 25 microfarads. |
| Capacitors 855, 884, 884′ | .05 microfarad. |
| Capacitor 872 | 1 microfarad. |
| Capacitors 880, 912, 916 | .01 microfarad. |
| Capacitor 883′ | .001 microfarad. |
| Capacitors 890, 891, 892, 893 | 10 microfarads. |
| Capacitors 938, 939 | .1 microfarad. |
| Secondary winding 828 | 30 volts. |
| Secondary winding 831 | 6.3 volts. |
| Secondary winding 832 | 500 volts. |
| Secondary winding 833 | 700 volts. |
| Secondary winding 906 | 30 volts. |
| Primary winding 827 | 115 volts, 400 cycles, 1 phase. |
| Primary winding 907 | 115 volts, 105 cycles, 1 phase. |
| Vibrator 864 | Synchronous at 400 cycles. |
| Triodes 860, 861, 862, 863 | Sections of 7F7 tubes. |
| Triodes 924, 925 | Sections of a CK1800 tube. |
| Rectifier 836 | 7Y4. |
| Transformer 880′ | 1:1 ratio. |

Values of components of the automatic pilot not mentioned above remain as previously given.

*Operation of the second modification of the coupling unit*

The normal condition of the coupling unit is that in which there is no voltage applied to input terminals 364′ and 365′ from the blind landing receiver. Under these conditions motor 935 remains inoperative, and sliders 900 and 950 are at the centers of their respective windings.

In the "Off" position of switch 800, the secondary winding 882′ of transformer 880′ is short circuited at bank 806 of the switch: no change in the input signal impressed on terminals 364′ and 365′ can therefore have any effect on the operation of motor 935.

Two other functions are performed by switch 800 in its "Off" position. In the first place, energization of transformer 905 is interrupted at phase reverser 812, so that no 105 cycle voltage is impressed across the winding of potential divider 947. In the second place, conductor 944 is connected to conductor 952 in bank 811 of switch 800, so that automatic pilot 18′ operates just as though it were not associated with a coupling unit at all: this operation of the automatic pilot has already been described in detail.

In the "Off" position of switch 800, resistors 850 and 851 in series are connected across capacitor 845, and resistors 852 and 853 in series are connected in series with the combination just recited. By this arrangement any signal applied to the input terminals is applied to the rate network to charge condenser 845, thus reducing the magnitude of initial transients in the later stages when these are subsequently made effective.

Now suppose switch 800 is moved to its "Inbound" position. No change takes place in the rate insertion circuit, by which an intermediate amount of modification of the incoming signal in accordance with its rate of change, and an intermediate amount of attenuation of the signal, take place. There appears between fixed contact 867 of vibrator 864 and ground conductor 854 a unidirectional voltage whose magnitude at any time depends upon the magnitude and rate of change of the signal from the blind landing instrument, and whose polarity depends on the polarity of the input signal. This unidirectional voltage is converted by vibrator 864 into an alternating voltage synchronous with the 400 cycle voltage supplied to transformer 830, and of a selected phase relation thereto. For the sake of illustration let it be assumed that movable contact 866 moves in an upward direction at the same time that the lower terminal of primary winding 827 is positive, as shown in FIGURE 12, and that the upper terminals of the secondary windings of transformer 830 are positive at the same instant.

First, consider the case when the output from the blind landing instrument is zero and motor 935 is stopped with sliders 900 and 950 at the centers of their windings. In this case, fixed contact 867 of vibrator 864 is at ground potential, and no change in the voltage applied to the grid of triode 876 takes place as vibrator 864 operates. No change accordingly takes place in the anode current of the triode, and no signal is coupled to the grid of the second triode 882. The same situation prevails in all stages of the amplifier, so that no output signal is impressed upon the grids of discriminator triodes 924 and 925, which remain at the cut off voltage with respect to the cathodes of these triodes by reason of the biasing voltage appearing across resistor 838. Winding 934 of motor 935 therefore remains deenergized, and although winding 937 of the motor is energized from conductors 818 and 819, no operation of the motor results from energization of this single winding, and sliders 900 and 950 remain at the centers of their respective windings. Accordingly no voltage is added in the turn control circuit of the automatic pilot from winding 946, and no voltage is addded in the grid circuit of triode 910 from winding 896. Since motor 935 is not operating, no voltage is supplied by velocity generator 895': the system is at rest.

It will of course be understood that if it is desired to operate discriminator triodes 924 and 925 at some bias potential other than zero, the fact that the grids of these triodes are at the same potential due to absence of signal from the amplifier means that the discriminator triodes discharge equally in successive half cycles of the alternating voltage. Winding 934 is thus continuously energized with pulses in the same direction, but since winding 937 of the motor is energized with pulses in opposite directions in successive half cycles, no resulting continuous rotation of motor 935 takes place. This operation of the system is believed less desirable, however, than that in which the discriminator tubes are biased to cut off.

With zero signal from the blind landing instrument slider 950 should be located at center tap 945, as previously described, so that no modification of the operation of the automatic pilot is brought about by the coupling unit. If it should happen that for some reason slider 950 is not at center tap 945, a correction of this condition must be brought about at once. This is accomplished by means including slider 900, which is displaced from the center of winding 896 whenever slider 950 is displaced from center tap 945. Slider 902 is normally set at the center of winding 901, so that any off-center location of slider 900 allows the grid circuit of triode 910 to be modified by the addition of a voltage from bridge 897 independently of the voltage supplied by triode 882. This independent voltage alternates at 400 cycles, the frequency of the voltage between conductors 818 and 819, and appears, amplified in magnitude, upon the grids of discriminator triodes 924 and 925. If slider 900 is above grounded slider 902 as seen in FIGURE 12, the grids of the discriminator triodes are positive when the upper terminal of winding 833 is positive, and triode 924 discharges in successive first half cycles of the alternating voltage, energizing winding 934 of motor 935. Winding 937 is continuously energized in 90° phase relationship from conductors 818 and 819, and rotation of the motor accordingly takes place, the direction of rotation being so chosen as to move slider 900 downward toward the position of slider 902, at the same time moving slider 950 toward center tap 945. As slider 900 moves downward the voltage from bridge 897 appearing in the grid circuit of triode 910 is reduced, until when the sliders are in their control positions, no signal from this source appears on the grid of the amplifier triodes, and in the absence of a signal from the blind landing receiver operation of motor 935 ceases. By this means slider 950 is brought to its normal position in the absence of a blind landing signal, and the directional and vertical gyroscopes of the automatic pilot control the movement of the craft.

Now suppose the craft is located at point $P_1$ in FIGURE 2, in the area in which the 90 cycle modulated carrier predominates over the 150 cycle modulated carrier and suppose that it is moving generally toward the station, so that the rate of change of the signal from the blind landing receiver is small. Under these conditions conductor 80 is positive and conductor 81 is negative as shown in FIGURES 4 and 12, and each time movable contact 866 of vibrator 864 disengages fixed contact 867, the grid of triode 876 becomes more negative with respect to the cathode. A square wave signal voltage thus appears on triode 876 which is out of phase with the alternating voltage of the source, and this voltage is transmitted through the first two stages of the amplifier, through transformer 880', and appear across resistor 895 in such a phase that the grid of triode 910 is passing through a negative half cycle at the same time that the upper terminal of winding 833 is passing through a positive half cycle. Accordingly, there appears upon the grids of the discriminator triodes a voltage which is passing through its positive half cycle when the plate voltage on triode 925 is passing through its positive half cycle: triode 925 discharges during alternate half cycles, energizing the winding 934 of motor 935 so that the motor operates in a direction to move slider 900 upwardly. This creates in the grid circuit of triode 910 a second voltage which opposes that coupled from triode 882, and when these two voltages are equal in magnitude and opposite in phase, the grid of triode 910 is at its normal potential, at which time no signal appears upon the grids of triodes 924 and 925, and operation of motor 935 is interrupted. Slider 900 accordingly comes to rest in a position upwardly displaced from center tap 902.

At the same time that slider 900 is being actuated to adjust the balancing voltage being supplied to the latter stages of the amplifier, slider 950 is also being displaced to the right from its center tap, thus adding into the automatic pilot turn control circuit a voltage from secondary winding 906 of transformer 905. By reason of the adjustment of the sliders 464' and 464'', this voltage is effective in the aileron and rudder bridges of the automatic pilot, in the proportions found satisfactory for coordinated turns made using the turn control knob. Primary winding 907 of transformer 905 is connected to conductors 118 and 119 in such a fashion that the voltage between slider 950 and center tap 945 of voltage divider 947 is of the proper phase to cause a turn to the right when slider 950 is displaced to the right from center tap 945, and when phase reverser 812 connects conductors 813 and 814 to conductors 118 and 119 respectively.

Rudder bridge 94 is normally balanced: the voltage in the turn control circuit from winding 946 is added to the input circuit of amplifier 105, unbalancing the amplifier to cause operation of motor 21 which continues until the voltage in the amplifier input circuit is zero. This voltage is changed by unbalancing bridge 94 to give a voltage equal in amplitude and opposite in phase to that in the turn control circuit. Operation of motor 21 moves slider 100 from its central position in a direction to supply a bridge unbalance voltage of the proper phase: when it is of the proper amplitude operation of the motor ceases. Since the rudder of the craft is operated by motor 21, it follows that when the desired amount of bridge unbalance takes place, the rudder moves to a particular displaced position.

Operation of the ailerons in response to the coupling unit signal in the turn control circuit is similar to that of the rudder. The rudder and aileron displacements are such as to cause the craft to commence a coordinated turn to the right. This change in heading changes the direction of movement of the craft relative to the transmitter, and hence the rate of change of the signal reaching the coupling unit changes: as the craft continues to approach the center of the beam the magnitude of the signal also changes. These changes appear in the amplifier as a change in the output from triode 882, and the effect of this output upon triode 910 becomes less than that of the voltage from secondary winding 828. The grids of the discriminator triodes are now positive when the upper terminal of secondary winding 833 is positive, and motor 935 is energized for operation in the opposite direction to that previously described, moving slider 900 back toward its central position and also moving slider 950 towards its center tap and reducing the signal being supplied to the automatic pilot. The automatic pilot bridges are accordingly readjusted, this time in the opposite direction, to reduce the amount of turn of the craft, until it settles down on the course heading along the center of the beam.

The control of the craft is further influenced by the action of velocity generator 895′, which functions to cause motor 935 to operate at a speed proportional to the amplitude of the modified signal. This means that control of the craft is exerted most powerfully when the craft is in greatest need of control by reason of large departure from the center of the beam, while the control is exerted less forcefully as the desired path is approached. The generator also gives the system antihunt properties.

In the "Glide" position of switch 800, only resistor 851 is in parallel with capacitor 845, and only resistor 853 is in series with the parallel combination. This reduces the rate modification inserted into the input signal, and also reduces the magnitude of the signal reaching fixed contact 867, compared to that impressed on terminals 364′ and 365′, to prevent over control, since when the craft is entering its glide it is very close to the station and to the ground and no changes in the signal should be permitted to have a pronounced effect on the control exerted by the automatic pilot. Except for the above, no change in the localizer channel of the coupling unit takes place when the switch is set in its "Glide" position: the operation of the glide path channel of the coupling unit has previously been discussed and will not be repeated in detail.

When switch 800 is in its "Outbound" position the rate insertion network operates in the same fashion as that just described in connection with the "Inbound" position of the switch. The only change brought about in the localizer channel of the coupling unit is that phase reverser 812 supplies to the primary winding 904 of transformer 905 a voltage which is of the opposite phase to that previously supplied. This means that for any displacement of slider 950 from center tap 945, a voltage of the opposite phase is supplied to the automatic pilot, and therefore a turn of the craft in the opposite direction is initiated. The necessity for reversal of the sense of the signal being supplied to the automatic pilot as the craft reverses in its direction with respect to the transmitting station has already been discussed.

In the "Navigate" position of switch 800, variable resistor 846 is connected in parallel with capacitor 845, and variable resistor 847 is connected in series with the combination. This position of switch 800 is used for example when the craft is being flown over a transmitter without landing at that location. Under such conditions the displacement and rate components of the signal applied to the grid of triode 876 must be adjustable, compared to the output from the blind landing receiver, over a considerable range, and the magnitudes of resistors 846 and 847 are selected to make this possible.

The only other change in the localizer channel of the coupling unit brought about in the "Navigate" position of the switch takes place in the phase reverser 812, which connects conductors 813 and 814 to conductors 118 and 119 not directly in either one of the two fixed phases, but through a phase reversing switch 815. Accordingly, it is possible to fly a course which approaches or recedes from a number of transmitting stations, simply by tuning the blind landing receiver to the frequency of each station in turn, and operating reversing switch 815 according as the craft is moving in one direction or the other along each beam.

*Nature of a system including further modification of the network*

In the modification of the invention about to be discussed, the stabilizing influence of the directional gyroscope is retained, during turns of the craft caused by the coupling unit. FIGURE 13 is a schematic showing of means for accomplishing this described result.

In FIGURE 13 elements identified in previous figures have been given the same reference numerals. Localizer receiver 12 is shown to energize the vertical needle 70 of cross pointer indicator 14, and also the input terminals 1000 and 1001 of a coupling unit 1002 constructed generally like that shown in FIGURE 12. Unit 1002 is shown to have power terminals 1003 and 1004 energized from any suitable source of alternating voltage, output terminals 1005, 1006, and 1007, energizing motor 935 through conductors 933 and 941 and ground connections 840 and 940, and feedback terminals 1010 and 1011 energized from velocity generator 895′, which is energized itself with alternating voltage from the source energizing terminals 1003 and 1004. Operation of motor 935 in accordance with the signal from the localizer channel takes place as described in connection with FIGURE 12, rotation of shaft 953 driving velocity generator 895′ and also acting through reduction gearing 954 to adjust bridge 897 in the coupling unit.

In this modification of the invention the automatic pilot includes a mechanical differential 1012 between directional gyroscope 1013 and directional arm 87. When the directional arm lock 1014 is released, slider 90 in the rudder bridge is actuated in accordance both with the stabilizing effect of the directional gyroscope, and with any correcting or steering effect supplied to differential 1012 through a second mechanical output 1015 from motor 935, which may include further reduction gearing 1016.

*Operation of the further modified system*

Normal control of the craft, with selector 802 in its "Off" position, is exercised by the automatic pilot in its usual fashion. The turn control knob functions as described in connection with FIGURE 7, to cause the directional arm lock to prevent any movement of slider 90 with respect to winding 92 during turns of the craft initiated by the turn control knob: when the craft is to be controlled by the blind landing equipment, the turn control knob is left in its central position.

When selector 802 is in any position other than "Off" the appropriate rate circuits are set up in coupling unit 1002, as previously described. The signal is modified in the desired proportion to its rate of change and controls the operation of motor 935, which acts through connection 953, as described in connection with FIGURE 12, to rebalance the coupling unit. Velocity generator 895′ performs the function of reducing hunting as also previously described. Motor 935 also acts through differential 1012 to affect the automatic pilot, as will now be described.

Suppose the heading of the craft is that required by the setting of the directional gyroscope, but its position is at $P_1$, to the left of the desired one. The signal modulated at 90 cycles exceeds that modulated at 150 cycles, needle 70 is displaced to the right, and a unidirectional voltage of a first polarity is impressed on input terminals 1000 and 1001, changing in magnitude, at a rate determined by the magnitude of the component of the craft's movement which is normal to the desired path. Coupling unit 1002 modifies the signal in a proportion to its rate of change which depends on the setting of selector 802, and motor 935 is energized for operation in a direction and at a speed determined by the polarity and magnitude of the modified signal and by the output from velocity generator 895'. Rebalance of the coupling unit thus begins to occur, and simultaneously a mechanical input is supplied at 1015 to differential 1012, which displaces slider 90 along winding 92 from the position in which gyroscope 1013 has been stabilizing it. Bridge 91 is thus unbalanced, and motor 101 actuates slider 100 in a direction to rebalance the bridge. At the same time the rudder is displaced, and this causes the craft to begin to turn, moving winding 92 with respect to the position which would be held by slider 90 under the sole control of gyroscope 1013: this latter movement is in opposition to the action of motor 935 on slider 90. If the speed of operation of motor 935 is properly adjusted as compared to the rate at which the craft can change its direction of movement, sliders 100 and 90 can achieve position of temporary balance, in which the movement in space of slider 90 due to motor 935 is equal to that of winding 92 in response to rudder displacement.

When the coupling unit is balanced, motor 935 ceases to operate, motor 21 moves slider 100 to a position when bridge 91 is balanced, and the craft is in a stable condition of turn. However the movement of the craft changes its position with respect to the desired path, and the coupling unit is oppositely unbalanced, initiating a reverse operation of the cycle just described. The system as a whole comes into equilibrium when the craft is on the desired path and moving along it.

In the discussion of the automatic pilot given above, it has been shown that the directional arm is effective in the rudder bridge of the automatic pilot. This showing has been used for the sake of simplicity: actually the directional arm is also effective in the aileron bridge circuit, as suggested by connection 87' to the slider 1102 of voltage divider 1100 in FIGURE 13. The winding 1099 of the voltage divider is center tapped at 1103, and is energized, through transformer 1101, from conductors 118 and 119.

Numerous other simplifications have been resorted to in the disclosures of the automatic pilot in the present application, in order to properly emphasize actual invention—the latter of course is equally satisfactory when used with more refined automatic pilots.

*Summary*

In the foregoing specification there has been clearly described a system for enabling a blind landing receiver to control an automatic pilot without a human intermediary. The general nature of the automatic pilot and the blind landing instrument have been given, and details of the construction of several modifications of suitable coupling means have been recited. The coupling means are shown to derive, from the source normally energizing the automatic pilot, alternating output voltages which reverse in phase and vary in magnitude with reversal in the polarity and variation in the magnitude of the unidirectional voltage applied thereto, and the alternating voltages are arranged to control the flight of the craft either toward the desired point or away from it along the prescribed path.

The disclosure in this application is closely related to a copending sole application of Benjamin Carpenter, Serial Number 49,441, filed Sept. 15, 1948 and assigned to the assignee of the present invention, now Patent 2,632,135.

Numerous objects and advantages of our invention have been set forth in the foregoing description, together with details of the structure and function of the invention, and the novel features thereof have been clearly described. The disclosure, however, is illustrative only, and we may make changes in detail, especially in matters of shape, size and arrangement of parts, within the principle of the invention, to the full extent indicated by the broad general meaning of the terms in which the appended claims are expressed.

We claim as our invention:

1. Craft control means comprising, in combination: a source of alternating voltage of a selected frequency; a blind landing system for giving a unidirectional output voltage of reversible polarity and variable magnitude on departure of a craft from a predetermined path in opposite directions and in variable amounts; an automatic pilot normally energized from said source and comprising normally balanced control means for causing actuation of the rudder and ailerons of a craft to normally maintain straight unbanked flight; and reversible coupling means controlled by said unidirectional voltage to unbalance said control means so as to cause the craft to change its direction of movement, said coupling means including adjustable means modifying said unidirectional voltage by its own rate of change in a plurality of different proportions, and switch means connected to said adjustable means, and having a first position in which the unbalance of said control means caused by departure of the craft from the predetermined path is of a first sense and in which the proportion of modification of said unidirectional voltage is small, and a second position in which the unbalance of said control means caused by departure of the craft from the predetermined path in said first direction is of the opposite sense and in which the proportion of modification of said unidirectional voltage is increased.

2. Craft control means comprising, in combination: a source of alternating voltage of a selected frequency; a blind landing system for giving a unidirectional output voltage of reversible polarity and variable magnitude on departure of a craft from a predetermined path in opposite directions and in variable amounts; an automatic pilot normally energized from said source and comprising normally balanced control means for causing actuation of the rudder and ailerons respectively of a craft to normally maintain straight unbanked flight; and coupling means controlled by said unidirectional voltage to unbalance each said control means so as to cause the craft to turn toward the predetermined path, said coupling means including means modifying said unidirectional voltage by its own rate of change in discretely variable proportions, means varying in discrete steps the amount of unbalance of each said control means brought about by a given change in said unidirectional voltage, and switch means having a first position in which the unbalance of said control means caused by departure of the craft from the predetermined path is of a first sense and in which the amount of modification of said unidirectional voltage is small, and a second position in which the unbalance of said control means caused by departure of the craft from the predetermined path in said first direction is of the opposite sense and in which the amount of modification of said unidirectional voltage is increased, the amount of unbalance of each said control means brought about by a given change in said unidirectional voltage remaining unchanged regardless of the position of said switch means.

3. Craft control means comprising, in combination: a source of alternating voltage of a selected frequency; a blind landing system for giving a unidirectional output voltage of reversible polarity and variable magnitude on departure of a craft from a predetermined path in opposite direction and in variable amounts; an automatic pilot normally energized from said source and comprising normally balanced control means, having a common portion, for causing actuation of the rudder and ailerons respectively, of a craft to normally maintain straight unbanked flight; and coupling means controlled by said unidirectional voltage to unbalance said control means by altering said common portion so as to cause the craft to turn toward the predetermined path, said coupling means including means modifying said unidirectional voltage by its own rate of change in discretely variable proportions, and switch means having a first position in which the unbalance of said control means caused by departure of the craft from the predetermined path is of a first sense and in which the amount of modification of said unidirectional voltage is small, and a second position in which the unbalance of said control means caused by departure of the craft from the predetermined path in said first direction is of the opposite sense and in which the amount of modification of said unidirectional voltage is increased.

4. In craft control means, a coupling unit comprising, in combination: input terminals adapted to be energized from a blind landing receiver which gives an output voltage reversing in polarity and varying in magnitude on departure of a craft from a predetermined path in opposite directions and in variable amounts; power terminals adapted to be energized from the same source of alternating voltage as an automatic pilot having normally balanced circuits for regulating the position of the control surfaces of a craft; output terminals adapted to be connected in said circuits to influence the condition of balance thereof; input means for modifying said unidirectional voltage by its rate of change in discretely variable proportions and for combining therewith a further voltage of fixed polarity, which is initially of greater magnitude than any value which said unidirectional voltage can assume, and which decays at a selected rate; means supplying to said output terminals, under the control of the voltage transmitted through said input means, alternating voltage derived from said source which is in phase with or 180 degrees out of phase with said source according as said transmitted voltage is of one polarity or the other, and which varies in amplitude as said transmitted voltage varies in magnitude; means varying in discrete steps the amplitude of said derived voltage resulting from a given magnitude of said transmitted voltage; means for introducing a time lag between change in the transmitted voltage and resulting change in the derived voltage; and switch means for simultaneously varying the degree of modification of said unidirectional voltage, varying the amplitude of the derived voltage resulting from a given magnitude of the transmitted voltage, and reversing the phase of the derived voltage resulting from a given polarity of the transmitted voltage, selectively preparing, supplying, and withholding said further voltage, and selectively causing and preventing introduction of said time lag.

5. In craft control means, a coupling unit comprising, in combination: input terminals adapted to be energized from a blind landing receiver which gives an output voltage reversing in polarity and varying in magnitude on departure of a craft from a predetermined path in opposite directions and in variable amounts; power terminals adapted to be energized from the same source of alternating voltage as an automatic pilot having normally balanced circuits for regulating the position of the control surfaces of a craft; output terminals adapted to be connected in said circuits to influence the condition of balance thereof; input means for modifying said unidirectional voltage by its rate of change in discretely variable proportions and for combining therewith a further voltage of fixed polarity, which is initially of greater magnitude than any value which said unidirectional voltage can assume, and which decays at a selected rate; means supplying to said output terminals, under the control of the voltage transmitted through said input means, alternating voltage derived from said source which is in phase with 180 degrees or out of phase with said source according as said transmitted voltage is of one polarity or the other, and which varies in amplitude as said transmitted voltage varies in magnitude; means varying in discrete steps the amplitude of said derived voltage resulting from a given magnitude of said transmitted voltage; means for introducing a time lag between change in the transmitted voltage and resulting change in the derived voltage; switch means having a plurality of positions; means including said switch means in an "Off" position for establishing a minimum degree of modification of said unidirectional voltage for withholding said further voltage, for preventing introduction of said time lag, for short circuiting said input terminals, and for interrupting the supply of said derived voltage; means including said switch means in an "Outbound" position for maintaining the same degree of modification of said unidirectional voltage, for preparing said further voltage to be combined therewith, for preventing introduction of said time lag, for setting at maximum the amplitude of the derived voltage resulting from a given magnitude of transmitted voltage, and for causing the phase of said derived voltage to have a 180 degree phase relationship to that of the source for a first polarity of the unidirectional signal; means including said switch means in a "Turn" position for increasing to a maximum the degree of modification of the unidirectional voltage, for combining said further voltage therewith, for causing introduction of said time lag, for maintaining unchanged the amplitude of the derived voltage resulting from a given magnitude of transmitted voltage, and for reversing the phase of the derived voltage resulting from the first polarity of the unidirectional voltage; means including said switch means in an "Inbound" position for reducing to an intermediate value the degree of modification of the unidirectional voltage, for withholding said further voltage, for preventing introduction of said time lag, and for maintaining unchanged the amplitude and phase of the derived voltage resulting from a transmitted voltage of said given magnitude and said first polarity; and means including said switch means in a "Glide" position thereof for establishing a minimum degree of modification of the unidirectional voltage, for withholding said further voltage, for preventing introduction of said time lag, for reducing the amplitude of the derived voltage resulting from a given magnitude of the transmitted voltage, and for maintaining unchanged the phase of the derived voltage resulting from said first polarity of the transmitted voltage.

6. In aircraft control apparatus, in combination: first and second receivers giving direct current signals determined respectively by the horizontal and vertical departures of a craft from a desired glide path; control means having an "Off" position, an "Inbound" position, and a "Glide" position; means controlling the vertical movement of the craft, in accordance with the signal from said second receiver, when said control means is in said "Glide" position only; and means controlling the horizontal movement of the craft in accordance with the signal from said first receiver when said control means is in said "Glide" position and said "Inbound" position, said last named means including means modifying said signal in accordance with its rate of change, to produce a control signal having components of displacement and rate, and means operated by said control means for reducing the ratio of said rate component to said displacement component when said control means is in said "Glide" position, compared to the ratio of said components when said control means is in said "Inbound" position.

7. Apparatus of the class described comprising, in combination: a vertical gyroscope including a roll pick-off and a roll erection system; a directional standard including a heading pick-off; servomotor means for operating the heading and roll control surfaces of an aircraft, including heading and roll follow-up pick-offs; balanceable networks including said pick-offs and connected to said servomotor means for controlling the operation of said servomotor means to normally stabilize the attitude of the craft about its heading and roll axes; manually adjustable means in said networks to select a desired attitude of said craft about each said axis; means operable to disable said roll erection system; means connected to said disabling means and actuable by one of said manually adjustable means to cause operation of said disabling means; radio responsive means for supplying a voltage determined by the horizontal displacement of the craft from a desired path; means connecting said radio responsive means to said networks for adding a signal determined by said voltage in said networks to control the craft in accordance therewith; voltage responsive means in said radio responsive means and independent of said manually adjustable means for causing operation of said disabling means when said voltage is present; and means interconnecting said disabling means and said last named means.

8. A navigating system comprising means for supplying a signal proportional to the lateral displacement of a craft from a directional radio path, means for supplying a signal in accordance with the rate of approach of the craft toward the radio defined path, means for providing a signal proportional to the angle of bank of the craft, and means connected to receive said signals for supplying an output determined at least in part by the algebraic sum thereof, in which system said means for providing a signal in accordance with the rate of approach of the craft includes a directional reference device and signal means operated by said device for providing a signal in accordance with the departure of the craft from an initial heading.

9. In a navigation system by means of which a craft may be controlled to approach and thereafter maintain a chosen course, means for obtaining a signal proportional to craft displacement from a radio defined path, a directional reference device including pick-off means for supplying a signal determined by the angle between the direction of flight of the aircraft and the bearing of said radio defined path, means for providing a signal proportional to the angle of bank of the craft, and means connected to receive said signals for supplying an output which varies in accordance with the resultant of said signals.

10. In a navigation system by means of which a craft may be controlled to approach and thereafter maintain a chosen course, means for obtaining a signal proportional to craft displacement from a radio defined path, a directional reference device including pick-off means for providing a signal determined by the angle between the direction of flight of the aircraft and the bearing of said radio defined path, a vertical reference device including pick-off means for supplying a signal proportional to the bank angle of the craft, and means connected to receive said signals for supplying an output representative of the algebraic sum thereof.

11. In a navigating system by means of which a craft may be controlled to approach and thereafter maintain a chosen course, means for obtaining a signal corresponding to the angle of bank of the craft, said signal having a predetermined value at a predetermined angle of bank, means for obtaining a signal proportional to craft displacement from a radio defined path, said second named signal normally, in the absence of limiting, varying over a range of values such that values appreciably larger than said predetermined value of the first named signal may be provided, means for limiting the maximum value of said second named signal to a magnitude substantially the same as said predetermined value, means connected to receive and combine said signals for giving a unitary output representative of their resultant, and guidance means connected to receive said output.

12. In a navigating system by means of which a craft may be controlled to approach and thereafter maintain a chosen course, means for obtaining a signal corresponding to the angle of bank of the craft, said signal having a predetermined value at a predetermined angle of bank, means for obtaining a signal proportional to craft displacement from a radio defined path, means for providing a signal having a value dependent upon the rate of approach of the craft toward said radio defined path, said second named signal normally, in the absence of limiting, varying over a range of values such that values appreciably larger than said predetermined value of the first named signal may be provided, said third named signal also normally varying over a substantial range, means for limiting the maximum value of at least one of said second and third named signals to a magnitude substantially the same as said predetermined value, means connected to receive and combine said signals for giving a unitary output representative of their resultant, and guidance means connected to receive said output.

13. In a navigating system by means of which a craft may be controlled to approach and thereafter maintain a chosen course, means for providing a first signal normally proportional to craft displacement from a radio beam, means for providing a second signal having a value dependent upon the rate of approach of the craft toward said radio beam, further means for limiting the maximum value of said first and second signals to some predetermined value less than that corresponding to the maximum value of said displacement and said rate, means for providing a third signal corresponding to the bank angle of the craft means connected to receive said signals for giving a unitary output representative of their resultant and guidance means operable in response to said output, so that operation of said guidance means in accordance with said first and second signals is limited.

14. In a navigation system of the character described, means for providing a first signal having a value determined by craft displacement from a prescribed ground track, means for providing a second signal having a value dependent upon the direction of craft approach toward said ground track, means for algebraically combining said first and second signals, means for limiting the maximum value of the resultant signal to some predetermined value, means for providing a signal having a value determined by the roll attitude of said craft, and guidance means connected to receive the resultant of said signals.

15. In a navigational aid for dirigible craft, the combination comprising first and second data systems each including a plurality of signal producing means for supplying signals dependent upon the attitude of a craft and its position with respect to a chosen flight path, a glide path receiver, switch means for connecting and disconnecting said receiver in input fashion to said first data system, at least one of said data systems including means for changing its own sensitivity by a fixed amount and means for operating said sensitivity changing means substantially simultaneously with an operation of said switch means.

16. In a navigational aid for dirigible craft, the combination comprising elevation and azimuth supervisory systems, each including means for supplying signals dependent respectively upon an attitude of the aircraft and upon a characteristic of its position relative to a chosen flight path; a glide path receiver; switch means for establishing and interrupting the functioning of said receiver as a signal source in said elevation supervisory system; means in said azimuth supervisory system operable to change the sensitivity of said system; and means operating said sensitivity changing means substantially simultaneously with operation of said switch means.

17. A system according to claim 9 in which each of said signals and said output are electrical and vary in magnitude and reverse in sense with variation in the magnitude and reversal in the sense of the respective quantities being measured.

18. A system according to claim 11 in which each of said signals and said output are electrical and vary in magnitude and reverse in sense with variation in the magnitude and reversal in the sense of the respective quantities being measured.

References Cited in the file of this patent

UNITED STATES PATENTS

| | | |
|---|---|---|
| 1,992,970 | Sperry et al. | Mar. 5, 1935 |
| 2,270,875 | Hanson et al. | Jan. 27, 1942 |
| 2,280,117 | Crane et al. | Apr. 21, 1942 |
| 2,322,225 | Crane et al. | June 22, 1943 |
| 2,369,131 | Braddon et al. | Feb. 13, 1945 |
| 2,409,970 | Agins | Oct. 22, 1946 |
| 2,423,336 | Moseley | July 1, 1947 |
| 2,423,337 | Moseley | July 1, 1947 |
| 2,424,568 | Isbister et al. | July 29, 1947 |
| 2,427,687 | Norgaard | Sept. 23, 1947 |
| 2,471,821 | Kutzler et al. | May 31, 1949 |
| 2,496,809 | Moseley | Feb. 7, 1950 |
| 2,516,796 | Noxon et al. | July 25, 1950 |
| 2,575,890 | Perkins et al. | Nov. 20, 1951 |